US007510475B2

(12) United States Patent
Loose et al.

(10) Patent No.: US 7,510,475 B2
(45) **Date of Patent: *Mar. 31, 2009**

(54) GAMING MACHINE WITH SUPERIMPOSED DISPLAY IMAGE

(75) Inventors: Timothy C. Loose, Chicago, IL (US); Wayne H. Rothschild, Northbrook, IL (US)

(73) Assignee: WMS Gaming, Inc., Waukegan, IL (US)

( * ) Notice: Subject to any disclaimer, the term of this patent is extended or adjusted under 35 U.S.C. 154(b) by 930 days.

This patent is subject to a terminal disclaimer.

(21) Appl. No.: 10/704,221

(22) Filed: Nov. 7, 2003

(65) Prior Publication Data

US 2004/0198485 A1 Oct. 7, 2004

Related U.S. Application Data

(63) Continuation-in-part of application No. 10/321,896, filed on Dec. 17, 2002, now Pat. No. 7,160,187, which is a continuation of application No. 09/862,574, filed on May 22, 2001, now Pat. No. 6,517,433.

(51) Int. Cl.
*A63F 13/00* (2006.01)

(52) U.S. Cl. ............................ 463/31; 463/30; 463/16; 463/20

(58) Field of Classification Search .................. 463/20, 463/31
See application file for complete search history.

(56) References Cited

U.S. PATENT DOCUMENTS

| | | | | |
|---|---|---|---|---|
| 4,306,768 | A | 12/1981 | Egging | 350/174 |
| 4,454,670 | A | 6/1984 | Bachmann et al. | 194/350 |
| 4,517,558 | A | 5/1985 | Davids | 340/700 |
| 4,562,433 | A | 12/1985 | Biferno | 340/716 |
| 4,568,928 | A | 2/1986 | Biferno | 340/716 |
| 4,718,672 | A | 1/1988 | Okada | 273/143 R |
| 5,393,061 | A | 2/1995 | Manship et al. | 273/143 R |
| 5,580,055 | A | 12/1996 | Hagiwara | 273/143 R |
| 5,697,843 | A | 12/1997 | Manship et al. | 463/20 |
| 5,722,891 | A | 3/1998 | Inoue | |

(Continued)

FOREIGN PATENT DOCUMENTS

EP 0 060 019 A1 9/1982

(Continued)

OTHER PUBLICATIONS

"Bigfoot" Product Sheet, Shuffle Master, Inc., 1 page (2000).

(Continued)

*Primary Examiner*—Robert E Pezzuto
*Assistant Examiner*—Frank M Leiva
(74) *Attorney, Agent, or Firm*—Nixon Peabody LLP

(57) ABSTRACT

A gaming machine comprises a primary gaming display for presenting the outcome of a wagering or bonus game and a video display. In response to a wager, an outcome is generated and displayed in a display area. The video display provides a video image superimposed upon primary game display. The video image may be interactive with the primary game display and include such graphics as payout values, a pay table, pay lines, bonus game features, special effects, thematic scenery, and instructional information.

20 Claims, 15 Drawing Sheets

U.S. PATENT DOCUMENTS

| | | | | |
|---|---|---|---|---|
| 5,725,210 | A | 3/1998 | Yamaguchi et al. | 273/121 |
| 5,752,881 | A | 5/1998 | Inoue | 273/143 R |
| 5,810,665 | A | 9/1998 | Takemoto et al. | 463/31 |
| 5,890,962 | A | 4/1999 | Takemoto | 463/20 |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,086,066 | A | 7/2000 | Takeuchi et al. | 273/143 R |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |
| 6,135,885 | A | 10/2000 | Lermusiaux | 463/20 |
| 6,164,645 | A | 12/2000 | Weiss | 273/138.2 |
| 6,181,301 | B1 | 1/2001 | Inoguchi et al. | 345/5 |
| 6,193,606 | B1 | 2/2001 | Walker et al. | |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,419,579 | B1 | 7/2002 | Bennett | 463/20 |
| 6,517,432 | B1 | 2/2003 | Jaffe | 463/16 |
| 6,517,433 | B2 | 2/2003 | Loose et al. | 463/20 |
| 6,817,946 | B2 | 11/2004 | Motegi et al. | 463/31 |
| 6,937,298 | B2 | 8/2005 | Okada | 349/58 |
| 7,097,560 | B2 | 8/2006 | Okada | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,204,753 | B2 | 4/2007 | Ozaki et al. | 463/16 |
| 7,255,643 | B2 | 8/2007 | Ozaki et al. | 463/20 |
| 2001/0031658 | A1* | 10/2001 | Ozaki et al. | 463/16 |
| 2002/0175466 | A1 | 11/2002 | Loose et al. | 273/143 |
| 2003/0060269 | A1 | 3/2003 | Paulsen et al. | 463/20 |
| 2003/0087690 | A1 | 5/2003 | Loose et al. | 463/20 |
| 2003/0157980 | A1 | 8/2003 | Loose et al. | 463/20 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0029636 | A1 | 2/2004 | Wells | 463/32 |
| 2004/0063490 | A1 | 4/2004 | Okada | 463/20 |
| 2004/0116178 | A1 | 6/2004 | Okada | 463/20 |
| 2004/0147303 | A1 | 7/2004 | Imura et al. | 463/16 |
| 2004/0150162 | A1 | 8/2004 | Okada | 273/292 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0198485 | A1 | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209678 | A1 | 10/2004 | Okada | 463/30 |
| 2004/0209681 | A1 | 10/2004 | Emori et al. | 463/31 |
| 2004/0209682 | A1 | 10/2004 | Okada | 463/31 |
| 2004/0214635 | A1 | 10/2004 | Okada | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0032571 | A1 | 2/2005 | Asonuma | 463/20 |
| 2005/0140088 | A1 | 6/2005 | Randall | 273/143 |
| 2005/0153775 | A1 | 7/2005 | Griswold et al. | |
| 2005/0187003 | A1 | 8/2005 | Adachi et al. | 463/16 |
| 2005/0192090 | A1 | 9/2005 | Muir et al. | 463/30 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0128467 | A1 | 6/2006 | Thomas | |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0149281 | A1 | 6/2007 | Gadda et al. | 463/34 |

FOREIGN PATENT DOCUMENTS

| | | | | |
|---|---|---|---|---|
| EP | 0 789 338 | A1 | | 8/1997 |
| GB | 2 124 505 | A | | 2/1984 |
| GB | 2 165 074 | A | | 4/1986 |
| GB | 2 253 299 | A | | 9/1992 |
| GB | 2 349 494 | A | | 11/2000 |
| JP | 61-279272 | | | 12/1986 |
| JP | 02-019182 | | | 1/1990 |
| JP | 04-109977 | | | 4/1992 |
| JP | A-H04-114676 | | | 4/1992 |
| JP | A-H04-341288 | | | 11/1992 |
| JP | 05-177043 | | | 7/1993 |
| JP | 06-039085 | | | 2/1994 |
| JP | 07-16340 | | | 1/1995 |
| JP | 60-061079 | | | 4/1995 |
| JP | 07-124290 | | | 5/1995 |
| JP | 07299189 | A | | 11/1995 |
| JP | 08-103541 | | | 4/1996 |
| JP | 2531253 | | | 1/1997 |
| JP | 9-207625 | | | 8/1997 |
| JP | 10-071228 | | | 3/1998 |
| JP | 10-091076 | | | 4/1998 |
| JP | 10-305130 | | | 11/1998 |
| JP | 10-328398 | | | 11/1998 |
| JP | 11-090017 | | | 4/1999 |
| JP | 11-099240 | | | 4/1999 |
| JP | 11-137774 | | | 5/1999 |
| JP | 11-152970 | | | 6/1999 |
| JP | 11-153970 | | | 6/1999 |
| JP | 11-244451 | | | 9/1999 |
| JP | WO 99/64997 | A1 | | 12/1999 |
| JP | 2000-51314 | | | 2/2000 |
| JP | 2000-65097 | | | 3/2000 |
| JP | 2000-68925 | | | 3/2000 |
| JP | 2000-262738 | | | 9/2000 |
| JP | 2001-350805 | | * | 12/2000 |
| JP | 2001-062032 | | * | 3/2001 |
| JP | 2000-238995 | | * | 9/2001 |
| JP | 2002-113150 | | | 4/2002 |
| WO | WO 99/53454 | A1 | | 10/1999 |
| WO | WO 00/32286 | A1 | | 6/2000 |
| WO | WO 2006/036948 | A2 | | 4/2006 |
| WO | WO-2006/036948 | A2 | | 4/2006 |

WO WO 2006/124976 A1 11/2006
WO WO 2007/011717 A2 1/2007

OTHER PUBLICATIONS

"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Goooaal!" Product Sheet, Bally Gaming, Inc., 2 pages (2000).
"Great Whites" Product Sheet, VLC, Inc. 2 pages (2000).
"Jackpot Stampede Deluxe™" Product Sheet, WMS Gaming, inc., 2 pages (1997).
"Loaded Dice" Product Sheet, Konami Gaming, 2 pages (2000).
"Neptune's Pearls" Product Sheet, Unidesa Gaming, 4 pages (2000).
"Penguin Pays" Product Sheet, Aristocrat Incorporated, 2 pages (1998).
"Stroke of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).
Decision of Refusal of Aug. 30, 2005, issued from Japanese Patent Office for the corresponding Japanese application No. 2000-051314.

* cited by examiner

GAMING MACHINE WITH SUPERIMPOSED DISPLAY IMAGE

RELATED FILES

This application is a continuation-in-part of U.S. patent application Ser. No. 10/321,896, filed Dec. 17, 2002 now U.S. Pat. No. 7,160,187, entitled "GAMING MACHINE WITH SUPERIMPOSED DISPLAY IMAGE" which is a continuation of U.S. patent application Ser. No. 09/862,574, filed May 22, 2001, entitled "REEL SPINNING SLOT MACHINE WITH SUPERIMPOSED VIDEO IMAGE," now U.S. Pat. No. 6,517,433; each of the above are hereby incorporated by reference.

FIELD

The present invention relates generally to gaming machines and, more particularly, to a gaming machine with a video image superimposed over a primary display of the machine.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001-2003, WMS Gaming, Inc. All Rights Reserved.

BACKGROUND

A reel spinning slot machine generally comprises a plurality of mechanical rotatable reels controlled by a processor. In response to a wager, the processor randomly selects an outcome from a plurality of possible outcomes and then causes the reels to be rotated and stopped to display the selected outcome. The selected outcome is represented by certain symbols on the reels being in visual association with a display area. If the selected outcome corresponds to a winning outcome identified on a pay table, the processor instructs a payoff mechanism to award a payoff for that winning outcome to the player in the form of coins or credits.

Heretofore, the display area of reel spinning slot machines has been fairly mundane. Any proposals for changing the appearance of the display area have been fairly minor and limited in capability. For example, in U.S. Pat. No. 6,056,642 to Bennett, reel symbols are colored by backlighting the symbols with colored light bulbs or similar means. In U.S. Pat. No. 6,027,115 to Griswold et al., the reels themselves contain electroluminescent elements that define one or more reel symbols, such as cherries, bars, a number "7," etc. If multiple electroluminescent elements are provided for a particular symbol, that symbol may be displayed in multiple formats. Although the above proposals change the appearance of the display area to some extent, a need exists for a spinning reel slot machine with a structure capable of effecting more extravagant changes to the appearance of the display area.

As a result, there is a need in the art for the present invention.

SUMMARY

The above-mentioned shortcomings, disadvantages and problems are addressed by the present invention, which will be understood by reading and studying the following specification.

Accordingly, a gaming machine comprises a primary gaming display for presenting the outcome of a wagering or bonus game and a video display. In response to a wager, an outcome is generated and displayed in a display area. The video display provides a video image superimposed upon primary game display. The video image may be interactive with the primary game display and include such graphics as payout values, a pay table, pay lines, bonus game features, special effects, thematic scenery, and instructional information.

The present invention is advantageous in that it is capable of effecting extravagant changes to the appearance of the display area and displaying the graphics within the player's focus (i.e., the mechanical reels).

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The foregoing and other advantages of the invention will become apparent upon reading the following detailed description and upon reference to the drawings.

Figure 1A:
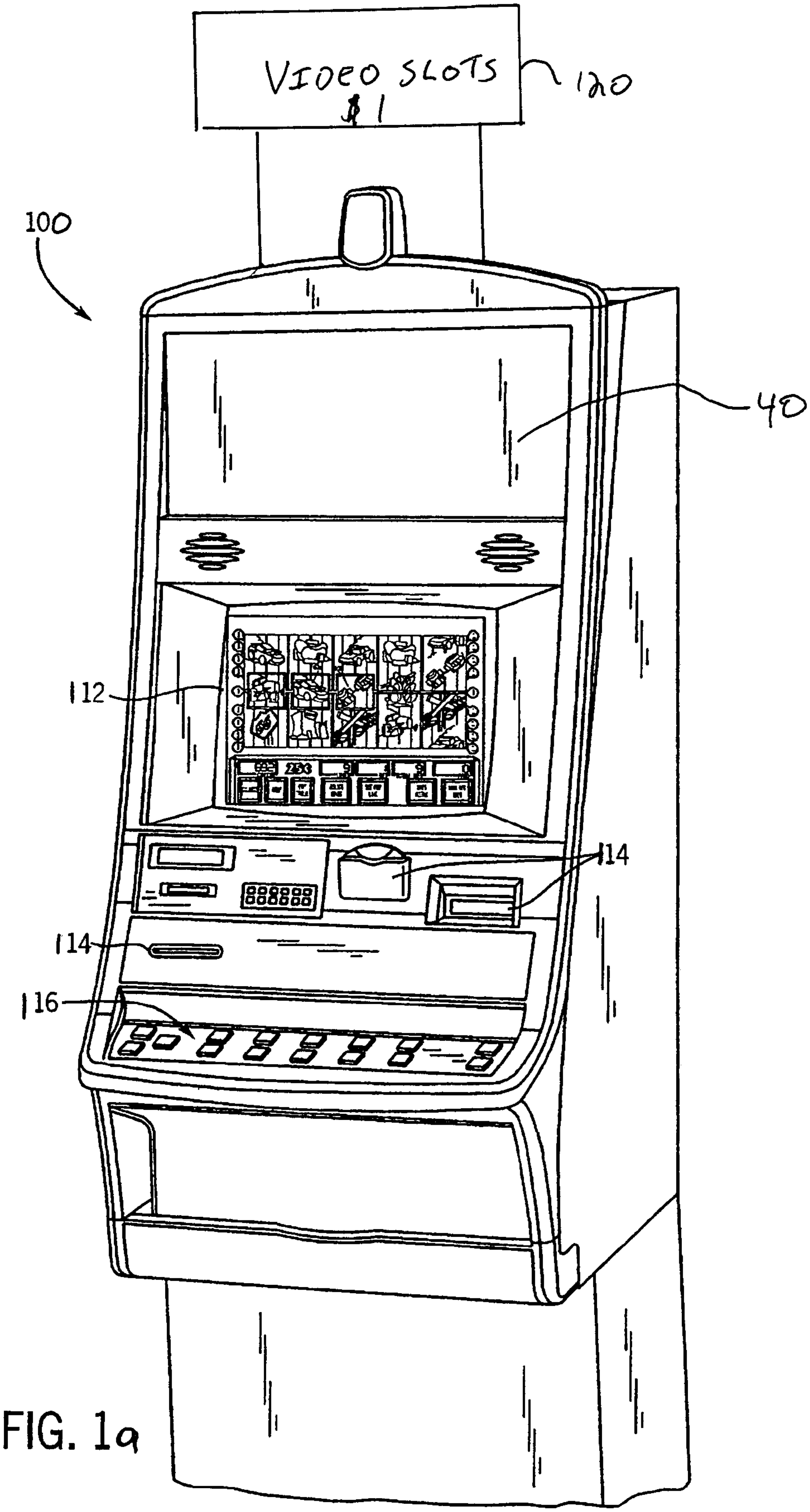
FIG. 1*a* is a perspective view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as “processing” or “computing” or “calculating” or “determining” or “displaying” or the like, refer to the action and processes of a computer system, or similar computing device, that manipulates and transforms data represented as physical (e.g., electronic) quantities within the computer system’s registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

FIG. 1*a* illustrates an exemplary gaming machine 100 in which embodiments of the invention may be implemented. In some embodiments, gaming machine 100 is operable to conduct a wagering game. These wagering games may include reel based wagering games such as mechanical or video slots, card based games such as video poker, or other types of wagering games such as video keno, video bingo or a video dice game (e.g. a Yahtzee® like dice game). If based in video, the gaming machine 100 includes a video display 112 such as a cathode ray tube (CRT), liquid crystal display (LCD), plasma, or other type of video display known in the art. In the illustrated embodiment, the gaming machine 100 is an “upright” version in which the display 112 is oriented vertically relative to a player. Alternatively, the gaming machine may be a “slant-top” version in which the display 112 is slanted at about a thirty-degree angle toward the player.

The gaming machine 100 includes a plurality of possible credit receiving mechanisms 114 for receiving credits to be used for placing wagers in the game. The credit receiving mechanisms 114 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 100 includes a user interface comprising a plurality of push-buttons 116, and other possible devices. The plurality of push-buttons 116 may, for example, include one or more “bet” buttons for wagering, a “play” button for commencing play, a “collect” button for cashing out, a help” button for viewing a help screen, a “pay table” button for viewing the pay table(s), and a “call attendant” button for calling an attendant. Additional game specific buttons may be provided to facilitate play of the specific game executed on the machine. A touch screen may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

In some embodiments, gaming machine 100 includes a top box 40. Top box 40 may contain a video display, a mechanical display, or a diorama display that supplements display 112. For example, the display in top box 40 may be a wheel such as a rotating wheel, mechanical dice, a board for a board game, or other such display.

A processor controls operation of the gaming machine 100. In response to receiving a wager and a command to initiate play, the processor randomly selects a game outcome from a plurality of possible outcomes and causes the display 112 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

In some embodiments, gaming machine 100 may include signage 120. Signage 120 may be a transmissive LCD device capable of displaying advertising, gaming information (e.g. type of game, denomination of game etc.) or other information to a player or potential player. Because portions of a transmissive LCD may be transparent or semi-transparent, the signage need not fully obstruct views beyond the gaming machine 100.

Figure 1B:
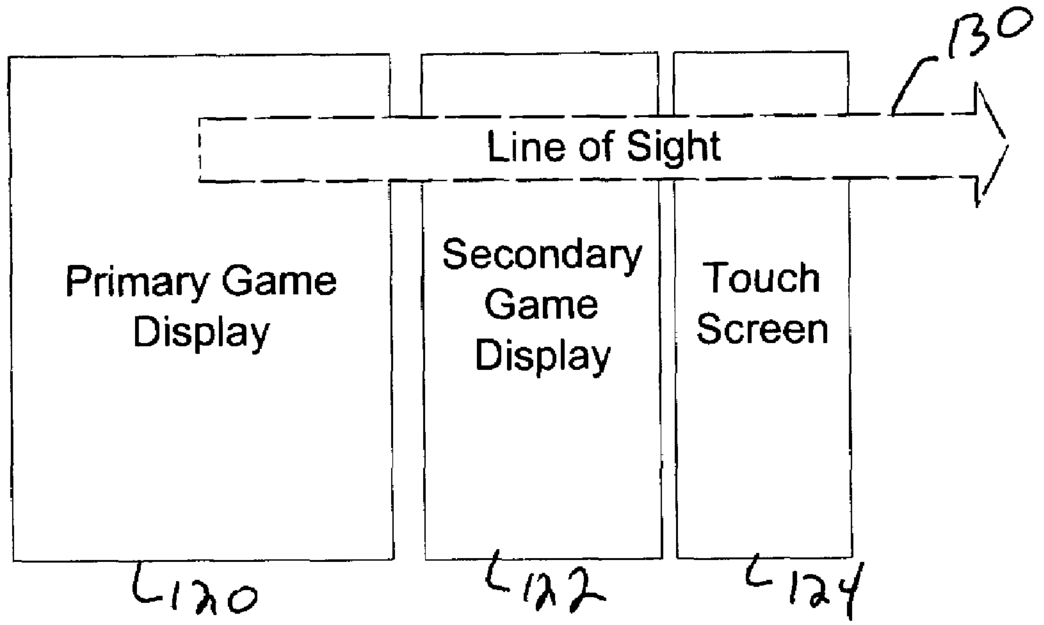
FIG. 1*b* is a side view of a game display according to embodiments of the invention.

FIG. 1*b* is a side view of a game display according to embodiments of the invention and illustrates further details of the display 112. In some embodiments, display 112 includes a primary game display 120, and a secondary game display 122. In some embodiments, primary game display 120 may be a mechanical display, such as a plurality of reels for a slot machine (described further below), a wheel, including a roulette wheel, one or more dice, a pachinko board, or other board game. No embodiment of the invention is limited to any particular mechanical display. In alternative embodiments, primary game display may be a video based display such as a CRT or LCD. In further alternative embodiments, primary game display 120 may be a diorama presenting a three-dimensional model for a game environment. In some implementations the diorama may be stationary, while in other implementations the diorama may slide or move in one or more dimensions.

Secondary game display 122 is positioned over primary game display 120. In some embodiments, secondary game display 122 provides a video image that may be selectively made transparent or semi-transparent (opaque), thus allowing the display of images on secondary game display 122 while allowing selective portions of the primary game display 120 to be seen through secondary game display 122. In some embodiments, secondary display 122 is a transmissive liquid crystal display (LCD). Line of sight indicator 130 shows the viewing direction, wherein images on primary display 120 pass through transparent or semi-transparent portions of secondary game display 122 to a player.

Additionally, some embodiments of the invention include touch screen 124 mounted on secondary game display 122.

It should be noted that a secondary game display comprising a transmissive display ay be positioned over top box display 40.

Figure 1C:
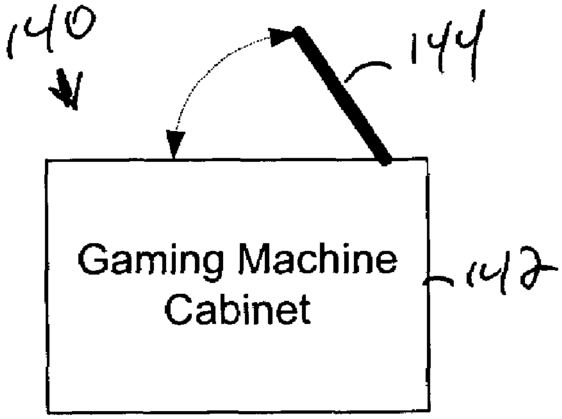
FIG. 1*c* is an isometric view of a spinning reel slot machine embodying the present invention.

FIG. 1*c* is a side view illustrating a gaming machine 140 according to alternative embodiments of the invention. In some embodiments, a gaming machine cabinet 142 houses components of a gaming machine such as a processor and memory that control the operation of the gaming machine. A game display 144 is coupled to the processor of the gaming machine, and may be rotatably mounted to game machine cabinet 142. In some embodiments, game display 144 is placed in a substantially horizontal position when not in use, and is rotated to a non-horizontal position when a player desires to play a wagering game. Game display 144 may be a transmissive LCD device, thereby allowing a player to see through transparent or semi-transparent portions of the display.

Figure 1D:
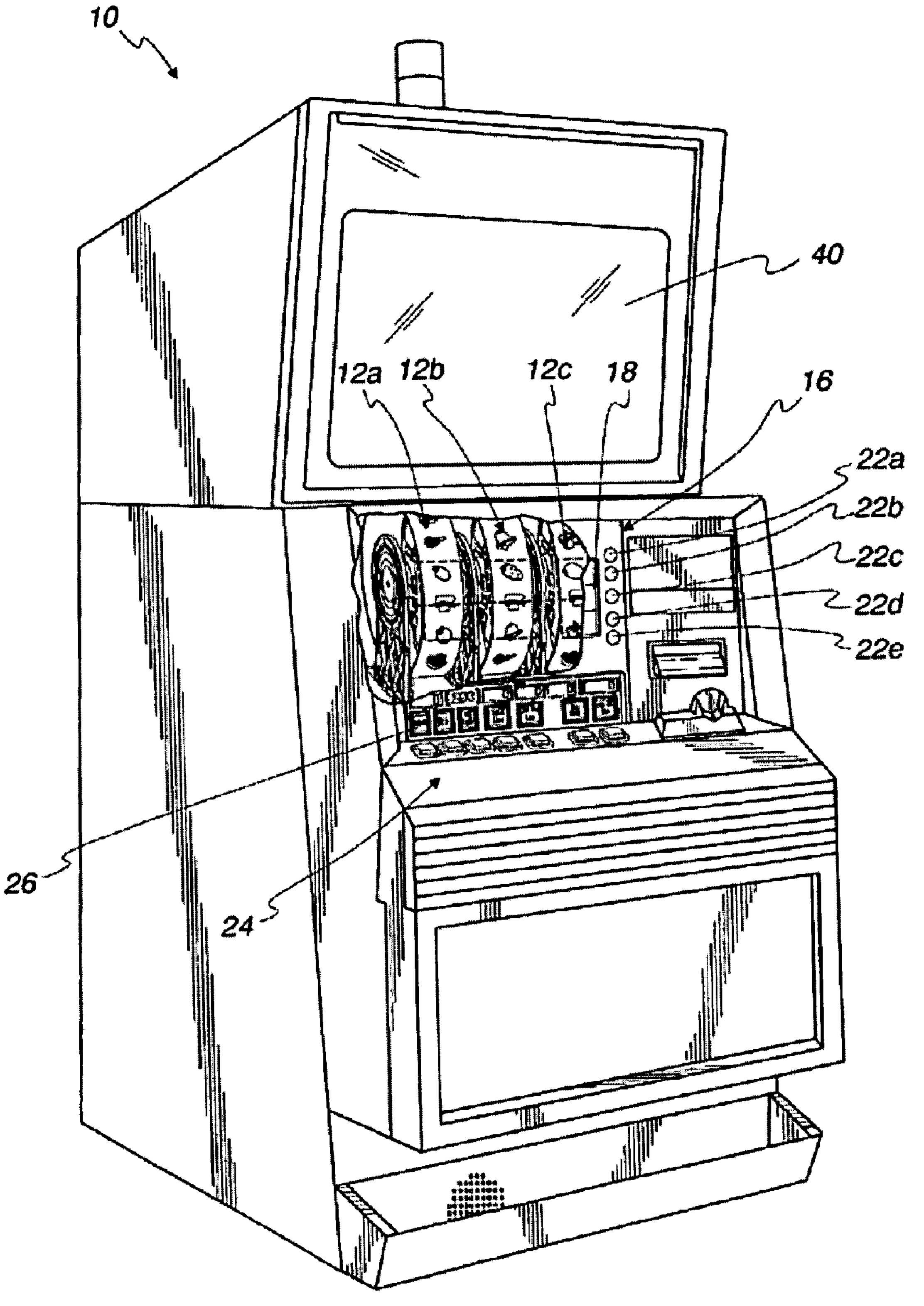
FIG. 1*d* is a side view of a gaming machine according to alternative embodiments of the invention.
Figure 2A:
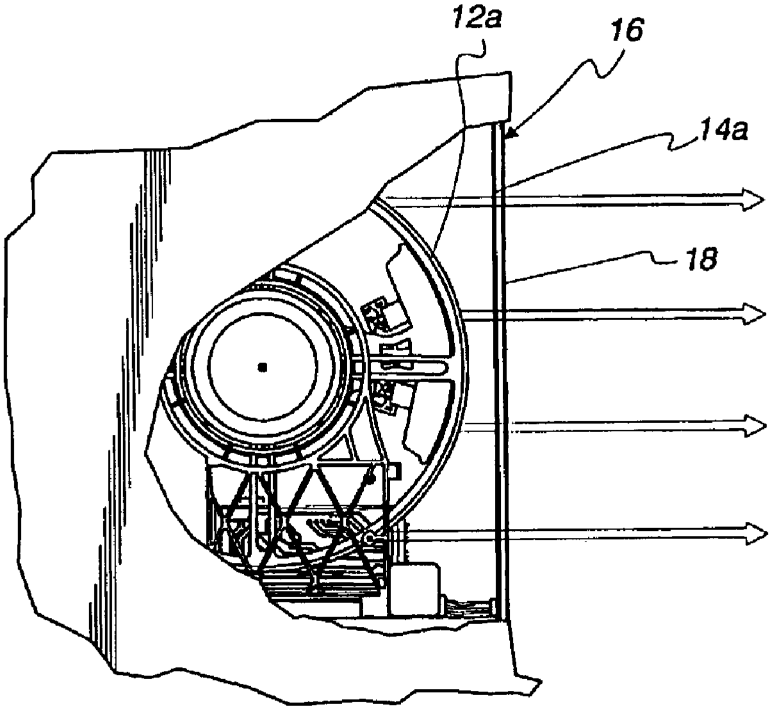
FIG. 2*a* is a side view of a slot machine embodiment with portions broken away to reveal internal structure in accordance with embodiments of the present invention.
Figure 2B:
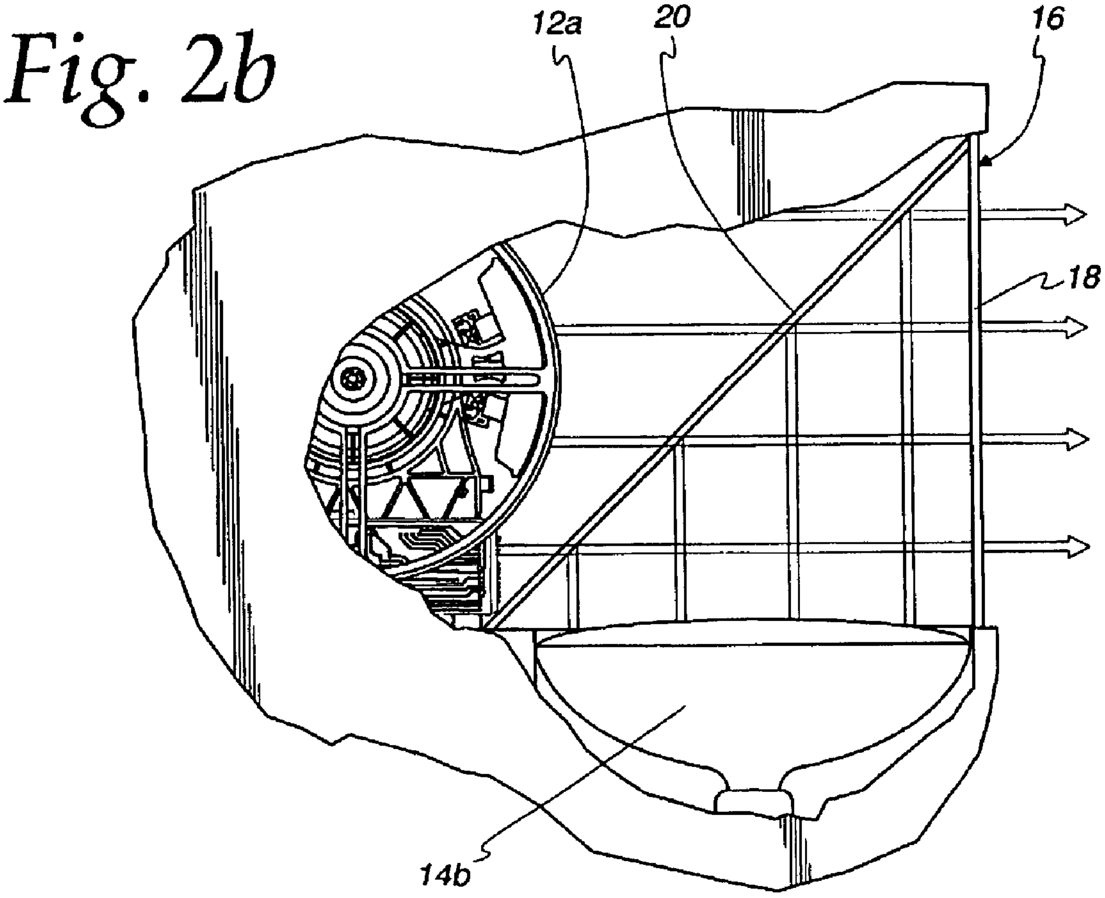
FIG. 2*b* is a side view of a slot machine embodiment with portions broken away to reveal internal structure in accordance with alternative embodiments of the present invention.

FIG. 1*d* illustrates an embodiment of the invention where the primary game display comprises a spinning reel slot machine 10 that includes a plurality of mechanical rotatable reels 12*a*, 12*b*, 12*c* and a video display (see FIGS. 2*a* and 2*b*). In response to a wager, the reels 12*a*, 12*b*, 12*c* are rotated and stopped to randomly place symbols on the reels in visual association with a display area 16. Payouts are awarded based on combinations and arrangements of the symbols appearing in the display area 16. The video display provides a video image 18 occupying the display area 16 and superimposed on the reels 12*a*, 12*b*, 12*c*. The video image 18 may be interactive with the reels 12*a*, 12*b*, 12*c*, may be static or dynamic, and may include such graphics as payout values, a pay table, pay lines, bonus game features, special effects, thematic scenery, and instructional information. In the illustrated embodiment, the slot machine 10 is an "upright" version in which the display area 16 is oriented vertically relative to the player. Alternatively, the slot machine 10 may be a "slant-top" version in which the display area 16 is slanted at about a thirty degree angle toward the player of the slot machine 10.

Referring to FIGS. 2*a* and 2*b*, the video image 18 in the display area 16 may be either a direct image (FIG. 2*a*) or a virtual image (FIG. 2*b*). If the video image 18 is a direct image, as in FIG. 2*a*, the direct image is preferably generated by a flat panel transmissive video display 14*a* positioned in front of the reels 12*a*, 12*b*, 12*c*. The transmissive display 14*a* may, for example, be a transmissive liquid crystal display (LCD) commercially available from LG Phillips LCD Co., Ltd., of Seoul, Korea. The transmissive display 14*a* may be outfitted with a touch screen mounted to a front surface of the display 14*a*. The touch screen contains soft touch keys denoted by the image on the underlying display 14*a* and used to operate the slot machine 10.

If the video image 18 is a virtual image, as in FIG. 2*b*, the virtual image is preferably generated by a projection arrangement including a video display 14*b* and a partially reflective mirror 20. The video display 14*b* and the partially reflective mirror 20 are relatively positioned to project the virtual image in front of the reels 12*a*, 12*b*, 12*c* between the reels and a player. The video display 14*b* is preferably mounted below the reels 12*a*, 12*b*, 12*c* and is generally perpendicular to the display area 16. The mirror 20 is preferably mounted in front of the reels 12*a*, 12*b*, 12*c* and is oriented at approximately a forty-five degree angle relative to both the video display 14*b* and the display area 16. The virtual image is generally parallel to the display area 16 and may, in fact, occupy the display area 16. Also, the virtual image may be three dimensional. In the embodiment of FIG. 2*b*, the display area 16 includes a glass cover/window. This cover is optionally outfitted with a touch screen that contains soft touch keys denoted by the virtual image and used to operate the slot machine 10.

The video display 14*b* in FIG. 2*b* may be a CRT, LCD, dot matrix, LED, electro-luminescent, or other type of video display known in the art. Also, instead of mounting the video display 14*b* below the reels 12*a*, 12*b*, 12*c*, the display 14*b* may be mounted above the reels with the mirror 20 still oriented at approximately a forty-five degree angle relative to both the video display 14*b* and the display area 16.

Figure 12:
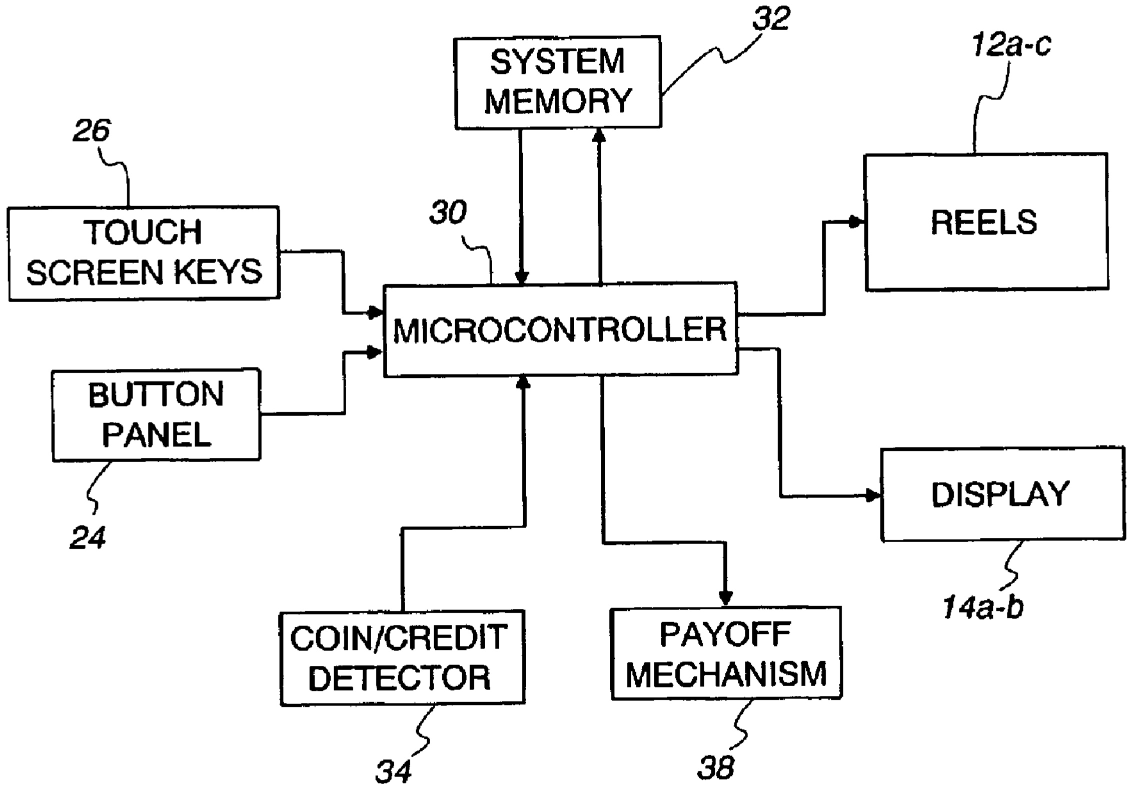
FIG. 12 is a block diagram of a control system suitable for operating the gaming machine.

Referring back to FIG. 1*d*, the slot machine 10 is operable to play a basic slot game with the three mechanical spinning reels 12*a*, 12*b*, 12*c* and a bonus game triggered by a start-bonus outcome in the basic game. The number of mechanical reels may vary, for example, to include one or more additional reels. The mechanical reels may be mounted to a horizontal axis to spin vertically as shown or may, alternatively, be mounted to a vertical axis to spin horizontally. Also, instead of each column of symbols being associated with a single reel, each individual symbol may be associated with a single reel such that a symbol array of nine symbols is associated with nine distinct reels. As shown in FIG. 12, in some embodiments of the invention, superimposed video image 18 may be used to provide one ore more video reels 1102 that may be included in a wagering game along with the physical reels. The rotational motion of a video reel may be synchronized with that of physical reels 12*a-c*. Additionally, in some embodiments, one or more physical reels may be removed from a wagering game by generating a superimposed video image 18 that blocks or obscures the desired reels from the view of the player.

Each of five pay lines 22*a*, 22*b*, 22*c*, 22*d*, 22*e* extends through one symbol on each of the three mechanical reels (and may extend through video reels 1102 in some embodiments). The number of pay lines may be more or less than five and may have various configurations. In some embodiments, one or more pay lines may be displayed on the superimposed video image 18. In addition, pay lines may be modified or skewed by the superimposed video image 18 such that the pay line passes through at least one different symbol that it did prior to the modification or skewing. A pay line may be modified or skewed at random times, predetermined times, or upon selection by a player. For example, a straight pay line may be skewed such that the pay line is no longer a straight line, but passes through symbols not in a straight line. Additional pay lines may be generated at random or at predetermined intervals during game play to provide additional opportunities for winning combinations from those pay lines initially presented to a player.

Figure 3:
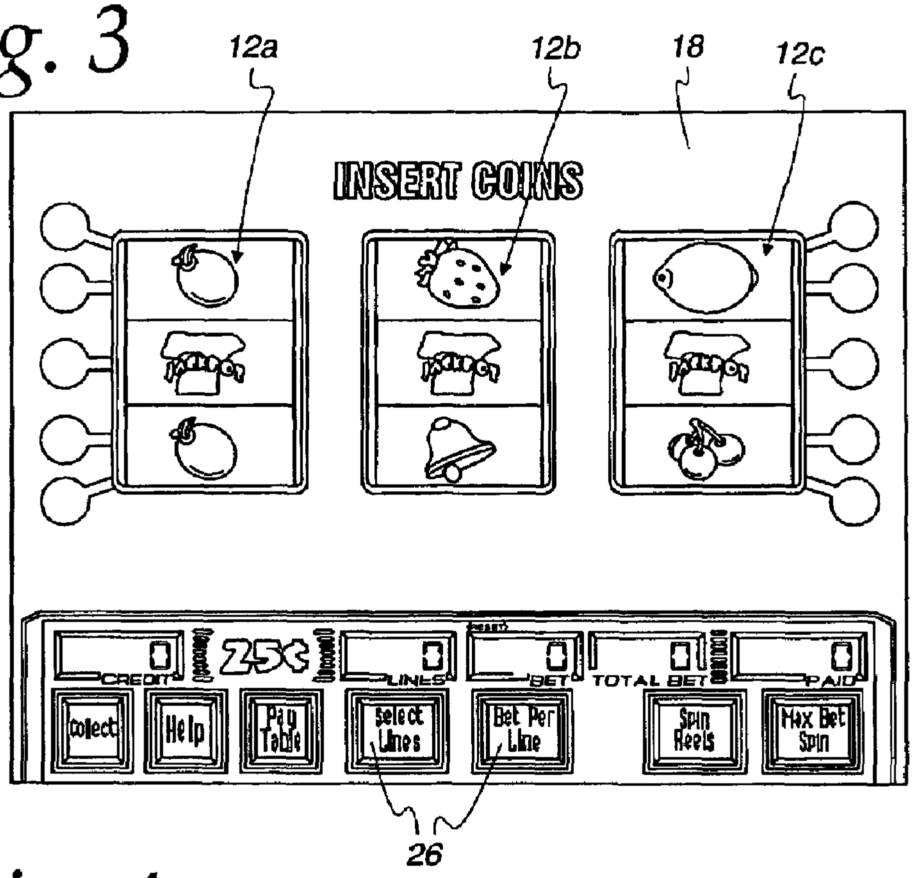
FIGS. 3 through 11 are front views of a display area of the slot machine with various video images superimposed on the mechanical reels.
Figure 4:
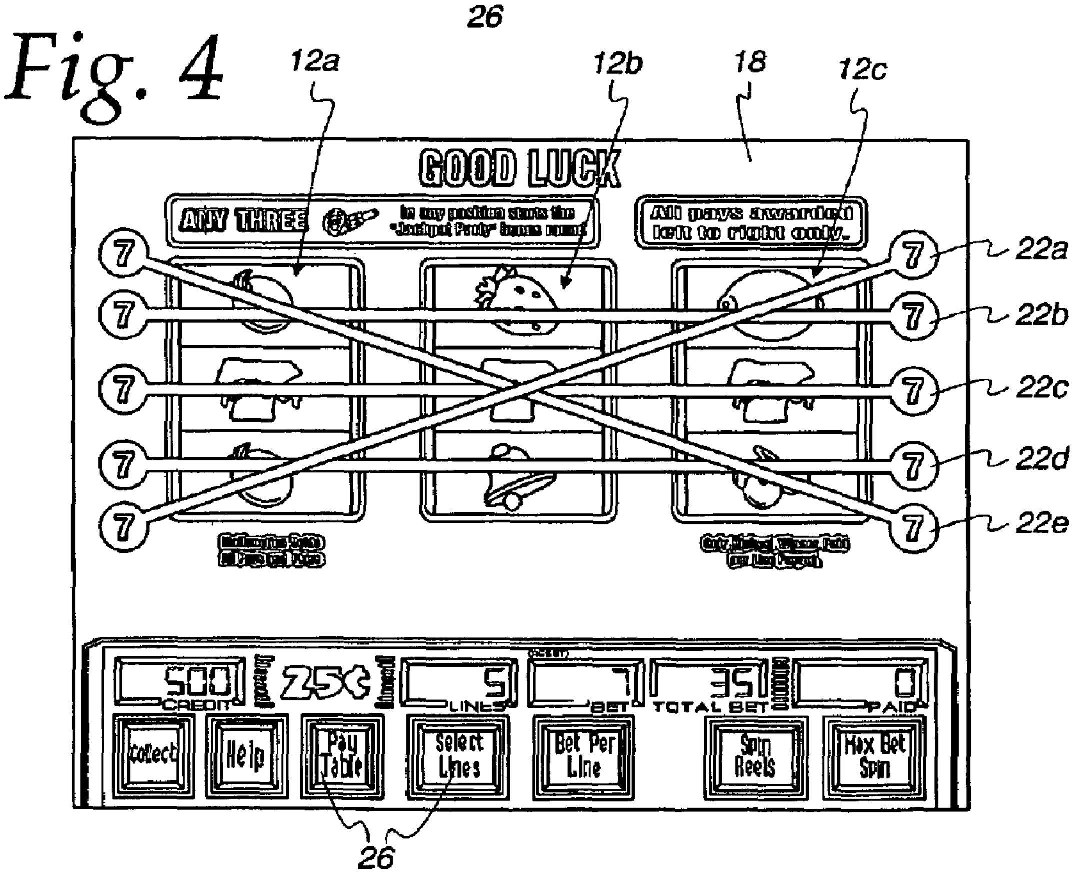

Generally, game play is initiated by inserting a number of coins or playing a number of credits, causing a central processing unit to activate a number of pay lines corresponding to the number of coins or credits played. As shown in FIG. 3, the superimposed video image 18 may depict instructional information prompting the player to insert coins or play credits. The player selects the number of pay lines (between one and five) to play by pressing a "Select Lines" key on a button panel 24. In alternative embodiments, a player may select particular pay lines displayed on the superimposed video image using the touch screen. The player then chooses the number of coins or credits to bet on the selected pay lines by pressing a "Bet Per Line" key on the button panel 24. As shown in FIG. 4, the superimposed video image 18 may depict the activated pay lines and the number of wagered credits per pay line.

After activation of the pay lines, the reels 12*a*, 12*b*, 12*c* may be set in motion by touching a "Spin Reels" key on the button panel 24 or, if the player wishes to bet the maximum amount per line, by using a "Max Bet Spin" key on the button panel 24. Alternatively, other mechanisms such as, for example, a lever may be used to set the reels in motion. The central processing unit uses a random number generator to select a game outcome (e.g., "basic" game outcome) corresponding to a particular set of reel "stop positions." The central processing unit then causes each of the mechanical reels to stop at the appropriate stop position. Symbols are printed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table may change over time, for example if play changes from a base wagering game to a bonus game. The superimposed video image 18 may be used to display the changed pay table.

Figure 5:
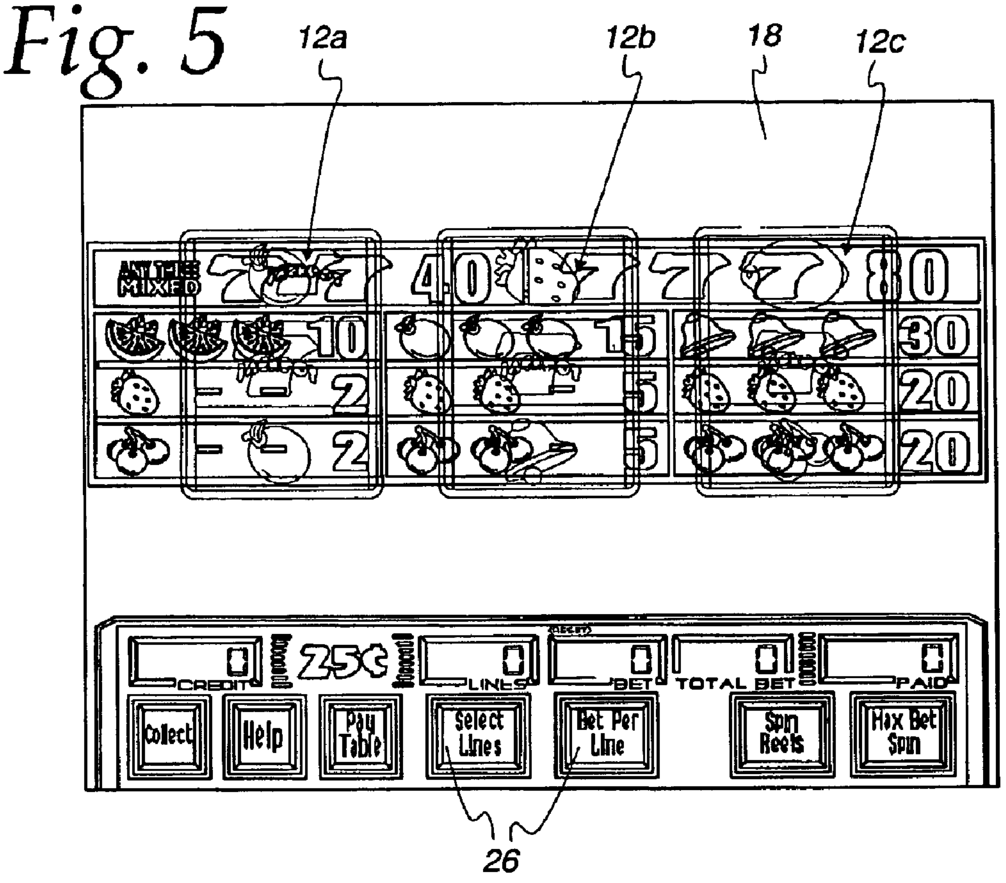

As shown in FIG. 5, the superimposed video image 18 may depict the pay table in response to a command by the player (e.g., by pressing a "Pay Table" key on the button panel 24). A winning basic game outcome occurs when the symbols appearing on the reels 12*a*, 12*b*, 12*c* along an active pay line correspond to one of the winning combinations on the pay table. A winning combination, for example, could be three matching symbols along an active pay line. If the displayed symbols stop in a winning combination, the game credits the player an amount corresponding to the award in the pay table for that combination multiplied by the amount of credits bet on the winning pay line.

Figure 6A:
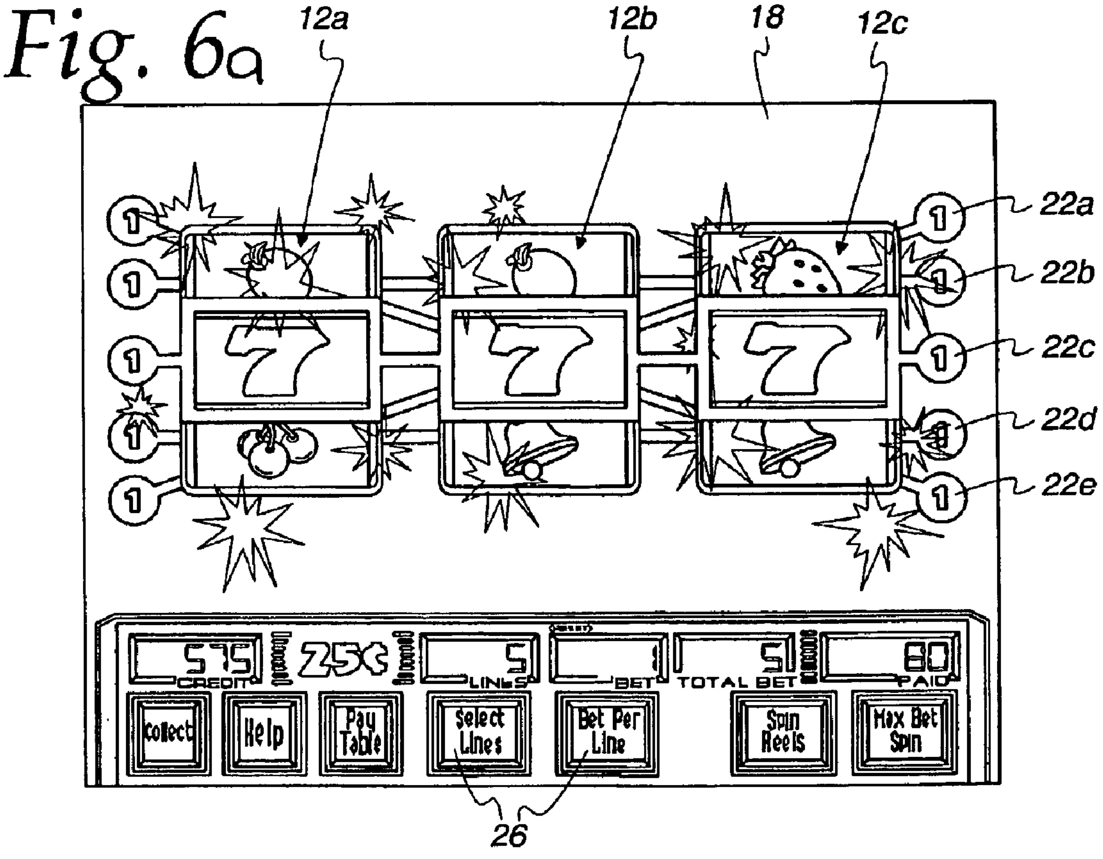
Figure 6B:
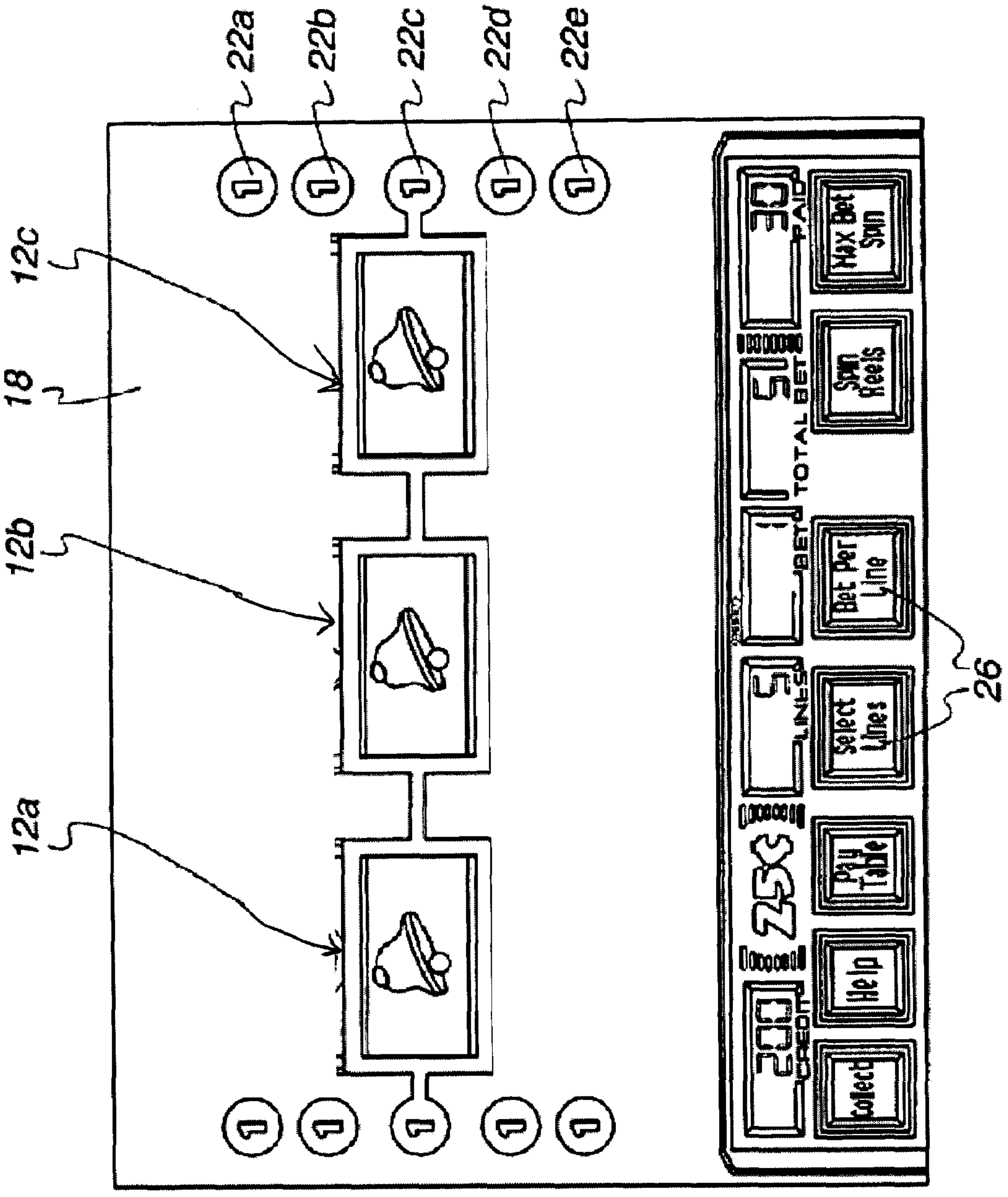

As shown in FIG. 6*a*, the superimposed video image 18 may highlight the winning combination(s) (e.g., "7," "7," "7") and its associated pay line (e.g., pay line 22*c*) and depict the award for that winning combination. Alternatively, as shown in FIG. 6*b*, the video image 18 may obscure all symbols not appearing on an active pay line or not part of a winning outcome. The video image 18 may further include special effects such as flashing the winning pay line(s) and/or the award and providing explosions. The winning pay line(s) may flash, be accompanied by exploding flashes, and display a portion of the pay table. The player may collect the amount of accumulated credits by pressing a "Collect" key on the button panel 24. In one implementation, the winning combinations start from the first reel 12*a* (left to right) and span adjacent reels. In an alternative implementation, the winning combinations start from either the first reel 12*a* (left to right) or the third reel 12*c* (right to left) and span adjacent reels.

In addition, some embodiments of the invention provide supplemental game display on superimposed video image 18. For example, in some implementations, an animated or live character may interact with the game. For example, a character may be used to identify an outcome (e.g. by pointing) or the outcome may be a winning outcome because the character is pointing at it.

In some embodiments, superimposed video image 18, along with a touch screen may be used to implement side betting. For example, a player may select a symbol from the primary game display and make a side bet as to whether or not the symbol will appear during the wagering game. The side bet information may be displayed on superimposed video 18. Such a side bet is independent of the outcome of the wagering game itself. Further details on side bets used in some embodiments are disclosed in U.S. patent application Ser. No. 10/428,516 filed May 1, 2003 and entitled "Gaming Machine with Interactive Pop-up Windows," which is hereby incorporated by reference herein.

In some embodiments, superimposed video image 18 may display a multiplier at random or predetermined intervals. The multiplier may then cause any winning outcome to be multiplied by the indicated multiplier.

In addition, in some embodiments, superimposed video image 18 may provide a foreground image that interacts with a background image on the primary display. For example, in some implementations, the background is a pachinko game comprising a plurality of pins and one or more lanes representing winning outcomes. The foreground image on superimposed video image 18 may comprise a simulated pachinko ball where the path through the pins is randomly generated to simulate an actual pachinko game. Similarly, the background image may comprise a roulette wheel and the foreground image on superimposed video image may be a roulette ball that "moves" around the roulette wheel and stops over a randomly selected position of the wheel. Additionally, the background may comprise a backlit board, and the foreground image may provide one or more tokens or markers that are moved to positions on the game board. In some implementations, the backlit board may comprise a ladder (i.e. a vertical strip) divided into positions having values. The foreground image may display an indicator or character (possibly animated) that points to a winning position on the ladder. Further, the background may comprise a diorama, and the foreground image may comprise one or more tokens or markers that are moved over positions in the diorama.

In some embodiments of the invention, superimposed video image 18 may be used to provide additional games instead of or in addition to interacting with a wagering game display on a primary game display 120. In one embodiment of the invention, an additional game played using superimposed video image 18 is a bank symbols game. In general, a bank symbols game operates by identifying certain symbols as "bankable" symbols. When these symbols appear on a reel or other game display, the symbol is collected in a bank symbolically displayed on superimposed video image 18. At some point during game play, if a predetermined symbol (sometimes referred to as a "break the bank" symbol) appears, the banked symbols may be redeemed for credit. Further details concerning the bank symbols game are disclosed in U.S. Pat. No. 6,159,098 entitled "Dual-Award Bonus Game for a Gaming Machine," which is hereby incorporated by reference herein. In an alternative implementation, the banked symbols may be used to play a second game, for example tic-tac-toe.

Other additional games that may be implemented include but are not limited to horse racing and other animated games, and video bingo, keno, slots etc. that may be displayed on superimposed video image 18.

If the display area 16 includes a touch screen mounted to either the transmissive display 14*a* in the direct image embodiment of FIG. 2*a* or the glass cover in the virtual image embodiment of FIG. 2*b*, the video image 18 may duplicate some or all of the aforementioned keys on the button panel 24 as touch keys 26 as shown in various Figures. A player can then enable a desired function either by touching the touch screen at an appropriate touch key 26 denoted by the video image 18 or by pressing an appropriate key on the button panel 24. Touch keys 26 may also be used to implement buttons in addition to those appearing on button panel 24. For example, one or more touch keys 26 may be used to select a denomination for the wagering game, call an attendant, solicit help in playing the game, request food or drink, or request "comps."

In reel based implementations, one or more touch keys 26 may be used to implement a "skill stop" function. In these implementations, upon pressing a "skill stop" touch key, the reel or reels associated with the skill stop touch key stop rotating.

Additionally, in implementations having a diorama as a primary game display, the touch screen may be used to indicate one or more elements of the diorama that a player desires to select. The superimposed video image may be used to highlight selected elements, for example by displaying a highlighted box around the selected element.

In some embodiments of the invention, the gaming machine may be capable of providing a number of different wagering games or variations on a wagering game. In such embodiments, the superimposed video 18 may be used to provide a menu of available games and/or game variations, and a user may use the touch screen to select a desired game or game variation.

Included among the plurality of basic game outcomes is a start-bonus outcome for triggering play of a bonus game. A start-bonus outcome may be defined in a number of ways. For example, a start-bonus outcome may occur when a special start-bonus symbol or a special combination of symbols appears on one or more of the reels 12_a_, 12_b_, 12_c_. The start-bonus outcome may require the combination of symbols to appear along an active pay line or may, alternatively, require that the combination of symbols appear anywhere on the display, regardless of whether the symbols are along an active pay line. The appearance of a start-bonus outcome causes the central processing unit to shift operation from the basic slot game to the bonus game.

Figure 7:
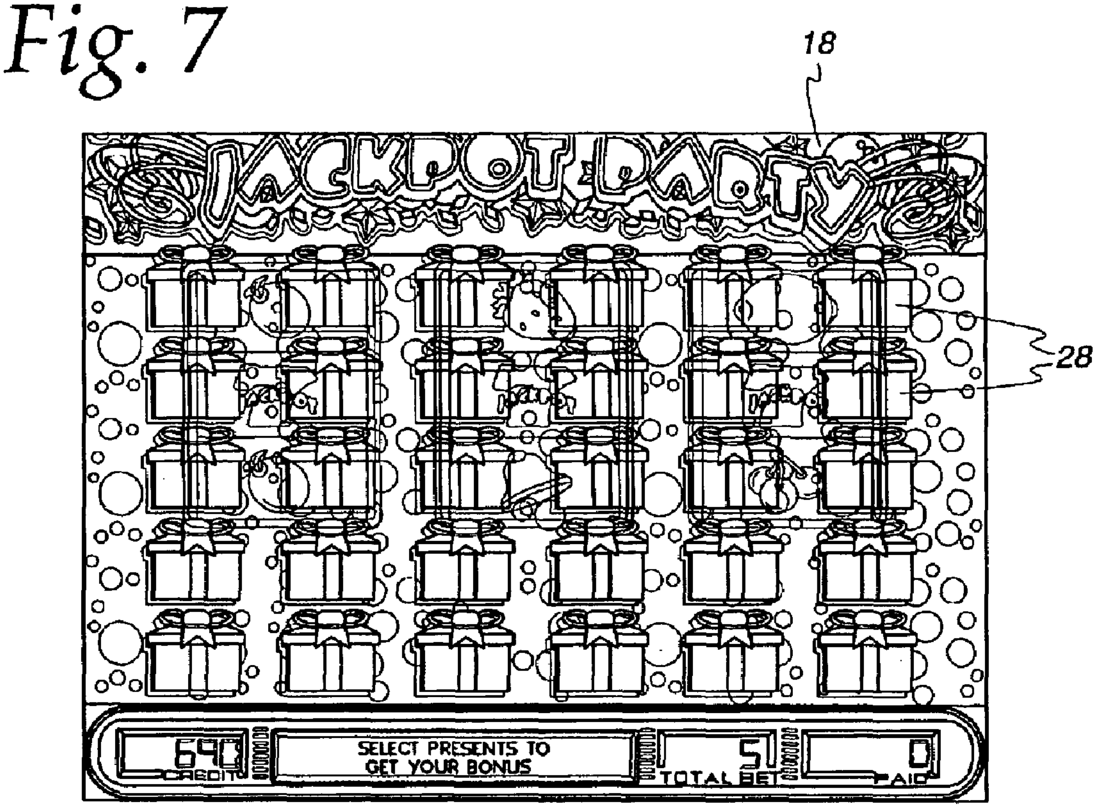

As shown in FIG. 7, the video image 18 may depict the bonus game and any bonuses resulting therefrom. The bonus game may, for example, include free spins of a new set of video reels included in the video image 18. Winning combinations on the video reels may be defined by the same pay table as used for the mechanical reels or a different pay table altogether. The bonus game may be interactive and require a player to select one or more selectable elements 28 to earn bonuses. Also, the bonus game may depict one or more animated events and award bonuses based on an outcome of the animated events. Furthermore, the bonus game may be depicted by the video image 18 alone or in conjunction with a video image depicted on an optional top box video display 40 (see FIG. 1_d_). The two video images may be linked to appear like one unified image. Upon completion of the bonus game, the central processing unit shifts operation back to the basic slot game.

In some embodiments, a bonus game may implement a shuffle feature. In these implementations, symbols on a reel may be converted to a number. The numbers are then displayed on superimposed video 18, and during the bonus game the numbers are shuffled. The resulting shuffled number represents the outcome of the bonus game. Further details on the shuffle feature may be found in U.S. Pat. No. 6,589,114 entitled "Shuffle Feature for a Game of Chance" which is hereby incorporated by reference herein.

In alternative embodiments, a bonus game may be played on the primary game display, and the superimposed video image 18 may be used to highlight symbols on the primary game display to indicate that a bonus game (and not a wagering game) is being played. For instance, in a reel based wagering game, the appearance of the reels or the symbols on the reels may be changed during bonus games. Examples of such appearance changes include changing the color, border highlighting, or shape of the reel or symbol using superimposed video 18 to indicate a bonus game is being played.

Any number of bonus games can be played, at least in part, on the superimposed video image, such as those bonus games disclosed in U.S. Pat. Nos. 6,607,437; 6,592,457; 6,589,114; 6,561,904; 6,554,704; 6,551,187; 6,517,432; 6,506,114; 6,443,837; 6,428,412; 6,364,766; 6,358,147; 6,347,996; 6,315,660; 6,270,411; 6,234,897; 6,203,429; 6,190,255; 6,159,098; 6,159,097; 6,155,925; and 6,004,207, which are hereby incorporated by reference herein.

Figure 8A:
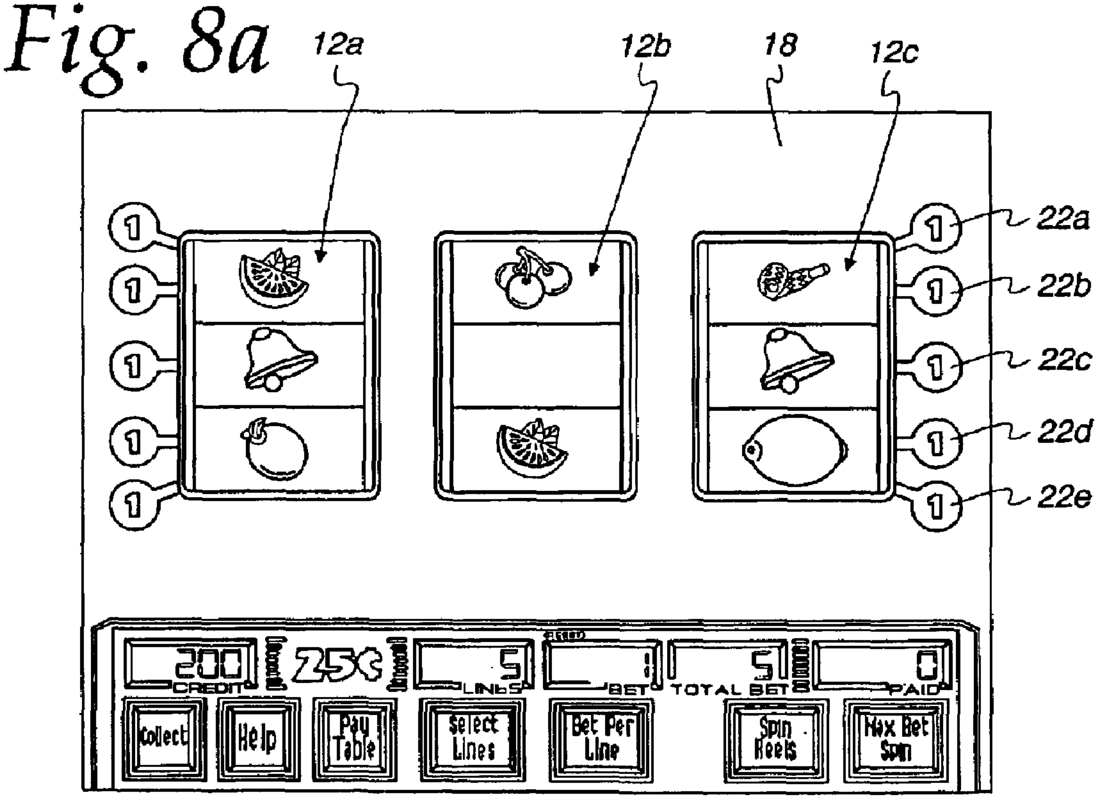
Figure 8B:
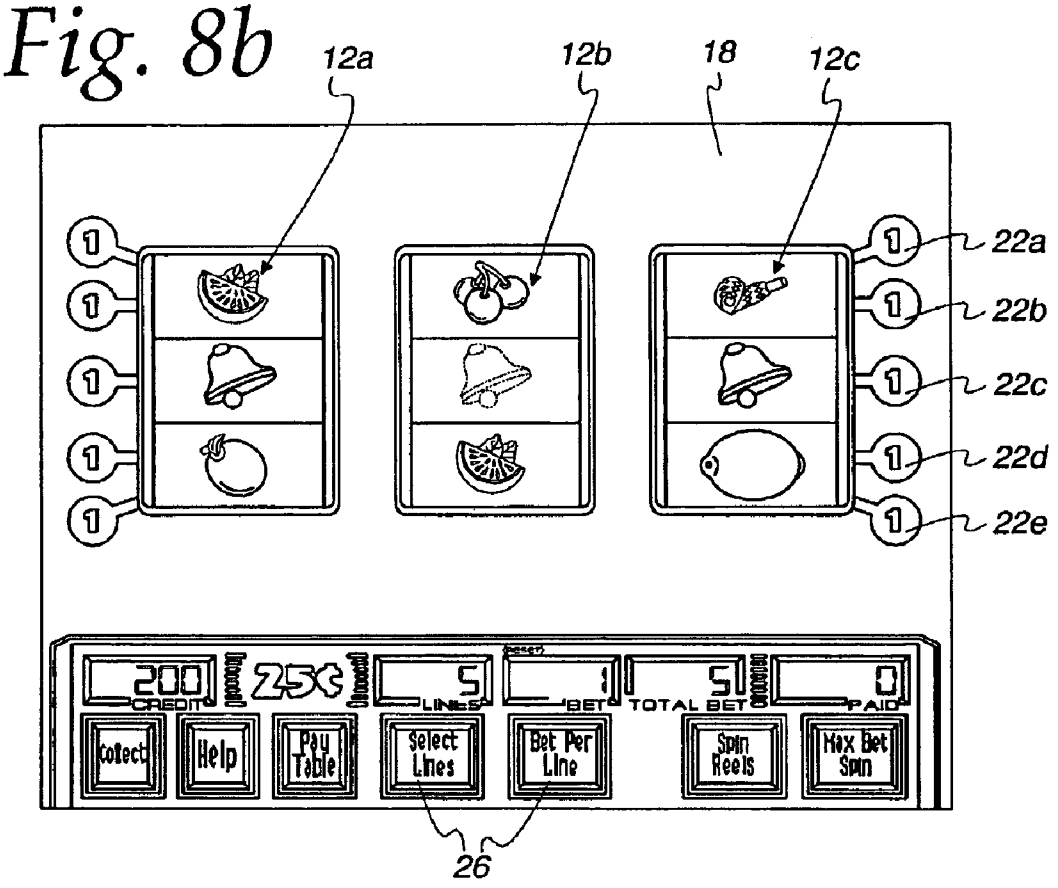
Figure 8C:
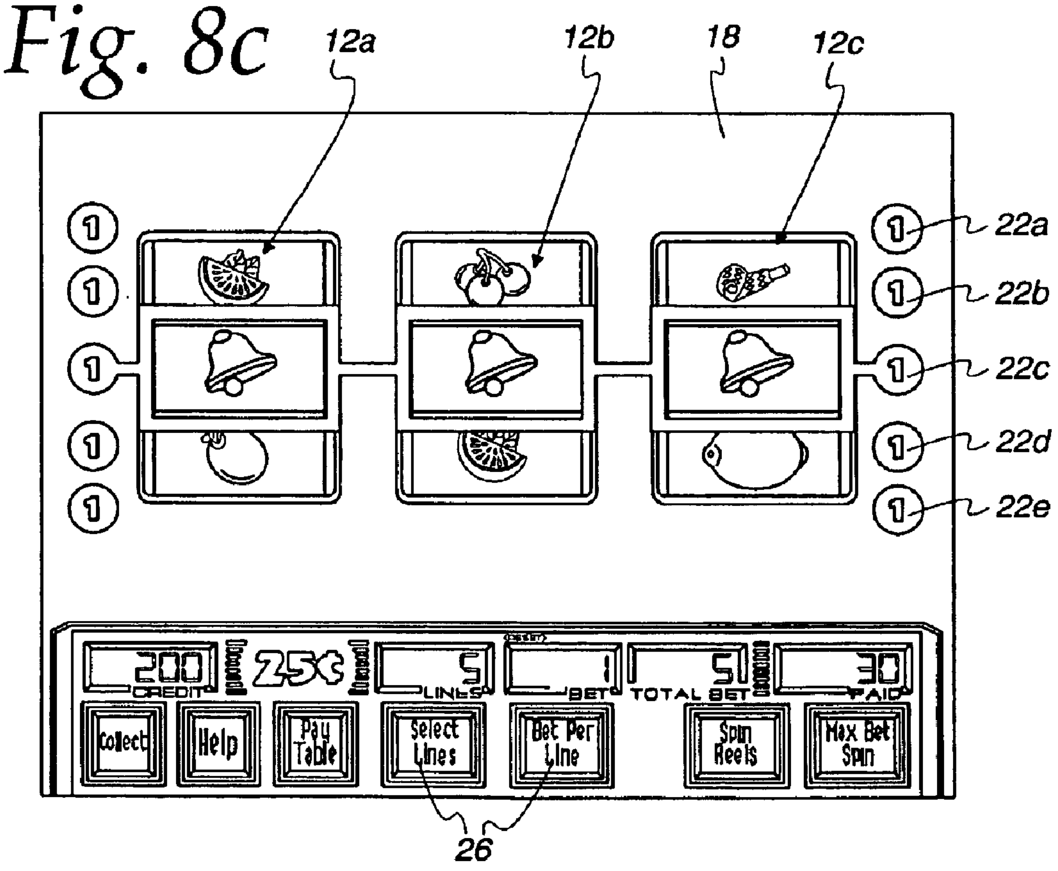

As shown in FIGS. 8_a-c_, 9_a-c_, and 10_a-c_, the video image 18 may be used to modify one or more symbols printed on one or more of the stopped mechanical reels 12_a_, 12_b_, 12_c_. For example, in response to a predetermined random or non-random event, the video image 18 may transform a reel symbol into a different symbol, such as a symbol needed to complete a winning combination. The different symbol is generated by the video image 18. In FIGS. 8_a-c_, the video image 18 depicts an animation transforming (e.g., "morphing") a blank symbol on mechanical reel 12_b_ into a BELL symbol to form a winning combination of three BELL symbols along pay line 22_c_.

Figure 9A:
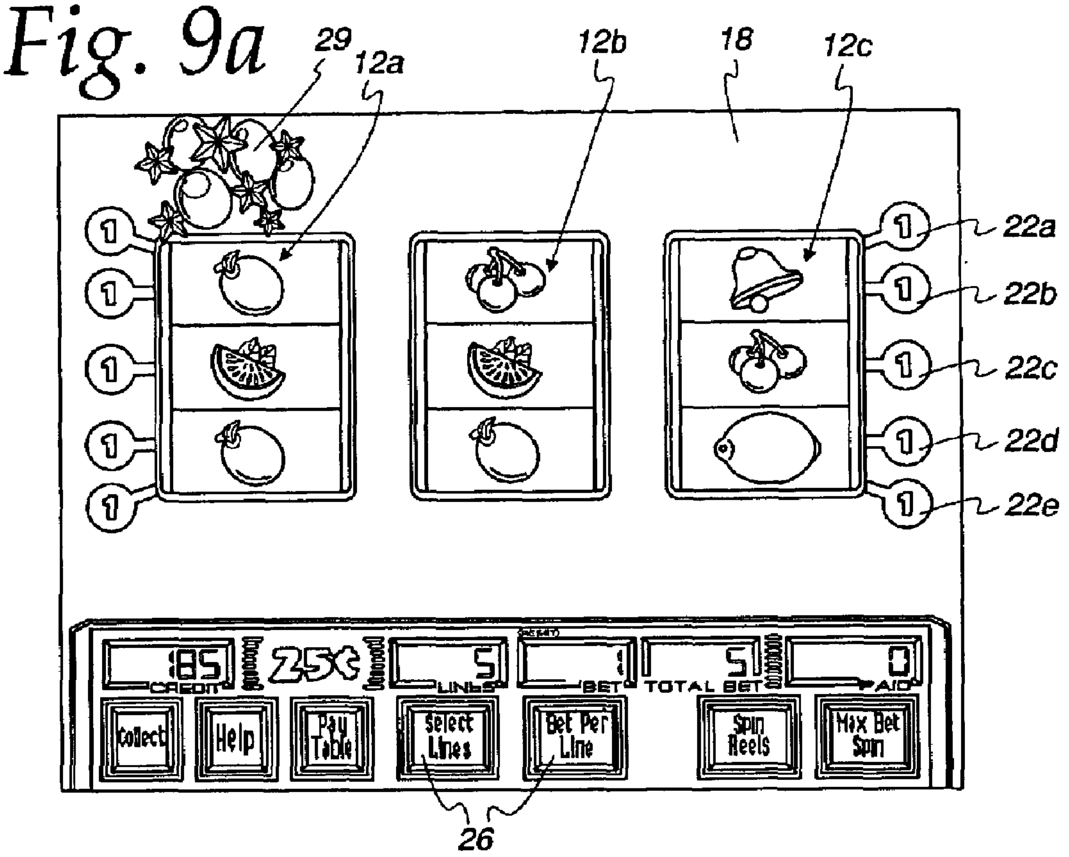
Figure 9B:
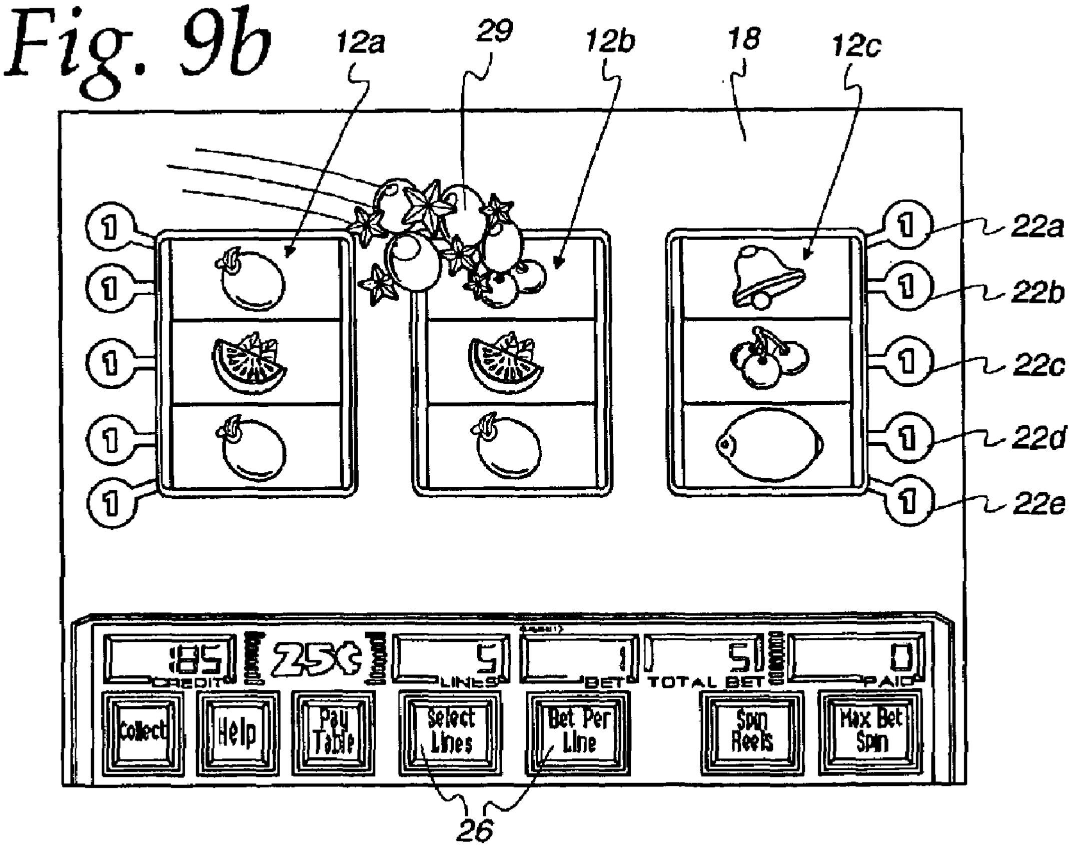
Figure 9C:
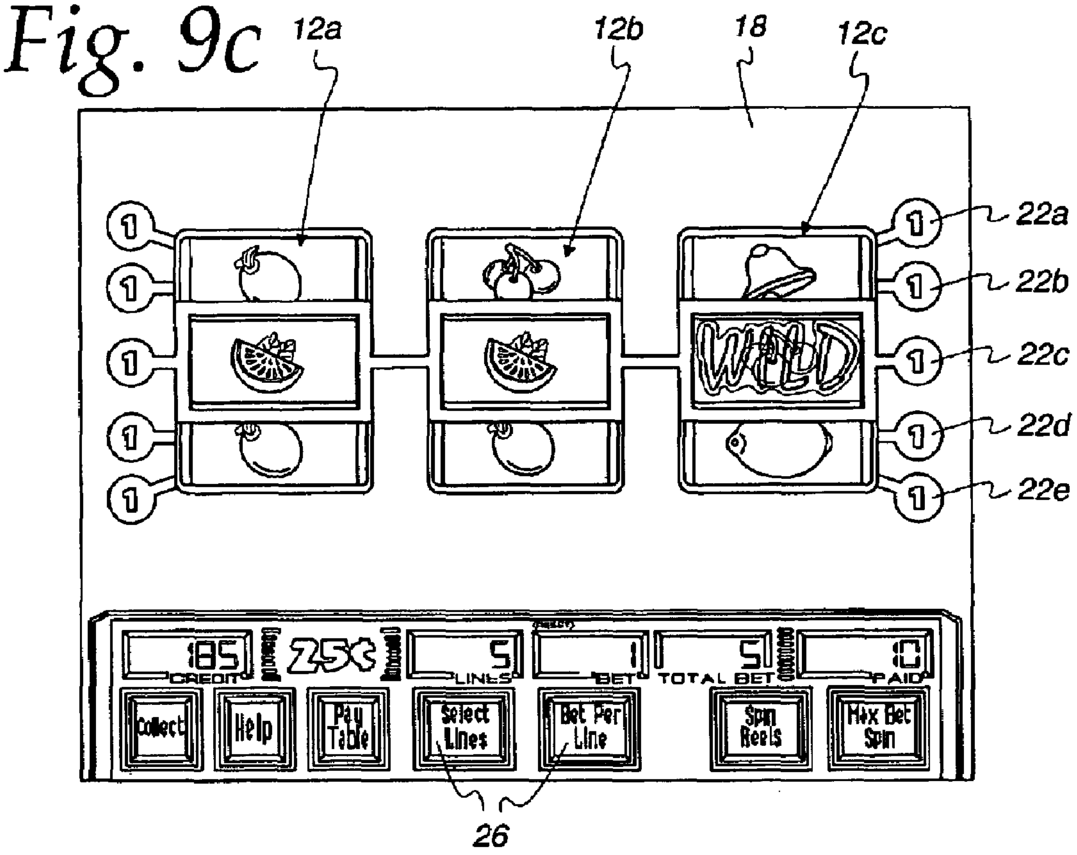

In addition, referring to FIGS. 9_a-c_, in response to a predetermined random or non-random event, the video image 18 may depict an animation in which a video indicator 29 is moved from a periphery of the display area (e.g., a corner of the display area away from the mechanical reels) to one or more of the symbols on the reels. The moving indicator 29 may identify the reel symbols to which it moves as a special symbol to be evaluated as, for example, a wild symbol or a scatter pay symbol. In further implementations, the moving indicator may comprise a window that moves over symbols.

In FIGS. 10_a-c_, a video indicator 29 has moved to a CHERRY symbol on mechanical reel 12_c_. If the CHERRY symbol is thereby designated a wild symbol, the displayed symbol array includes a winning combination of three MELON symbols along pay line 22_c_ where one of the three MELON symbols is formed by the wild symbol. Further, in FIGS. 10_a-c_, the video image 18 depicts an animation transforming a BELL symbol on reel 12_c_ into a SEVEN symbol to form a winning combination of three SEVEN symbols along pay line 22_c_. The replacement SEVEN symbol generated by the video image 18 is sufficiently opaque or translucent to substantially cover the BELL symbol printed on mechanical reel 12_c_.

In some embodiments, the symbols display on a primary game display may be either blank or generic, and the superimposed video image 18 may be used to differentiate the symbols by adding supplemental indicia. For example, a generic reel based gaming machine may comprise reels having blank or generic symbols, and the superimposed video image may be used to provide a theme for the wagering game. Further, the symbols may be blank and the supplemental indicia may add a value to the symbol. In some embodiments, the supplemental indicia may add a rank and/or suit to symbols representing playing cards. In some embodiments, the video image 18 may be synchronized with the movement of the reels. In further implementations, a live video or generated animation may be displayed over one or more symbols on a mechanical reel.

While symbols on reels have been described above, it should be noted that any type of symbol display mechanism may be used. For example, the symbols may appear on a "flipper" comprising a series of tabs arranged on a hub. Two of the tabs, a top and bottom tab are exposed to the player and present a symbol. As the hub rotates, the next tab "flips" over, thereby exposing a new top and bottom tab. A video image may be superimposed over such a top and bottom tab in the same manner as discussed above with respect to symbols on reels. The invention is not limited to any particular mechanism for displaying a symbol or symbol space.

The slot machine is preferably designed to adjust the appearance of the video image 18 in terms of transparency, translucency, or opacity depending on the purpose of the video image 18. On the one hand, to permit clear viewing of the mechanical reels 12*a*, 12*b*, 12*c* underlying the video image 18, the portion of the video image 18 directly overlying the reels is made more transparent.

On the other hand, to facilitate viewing of the video image 18 without visual interference from the underlying mechanical reels, the video image 18 is made more opaque through proper selection of colors and their level of brightness. Also, to accentuate the video image 18 relative to the underlying reels following a reel spin, any lamps illuminating the reels during a reel spin may be turned off or dimmed following the reel spin. In addition, if the reels include blank symbols (e.g., solid white areas), any video graphics over such blank symbols will be readily visible. Similarly, any video graphics alongside, just above, or just below the underlying reels will be readily visible.

Further, in the direct image embodiment of FIG. 2*a*, the transmissive video display 14*a* may be backed by an extendable opaque shade during the bonus game. The shade is retracted from the display area 16 during the basic slot game. When the central processing unit shifts operation from the basic slot game to the bonus game, the shade extends through the display area to separate the transmissive video display 14*a* from the underlying reels and thereby completely shield the underlying reels.

Superimposed video image 18 may be used to display non-gaming images. For example, in some implementations, superimposed video image 18 may display advertising. Further, in attract mode, a superimposed video image 18 may be used to display images designed to entice a player to keep playing, or a potential player to start playing the wagering game.

In some embodiments of the invention, superimposed video image 18 may be used to provide an administrative interface to a gaming machine. For example, the superimposed video image 18 may provide a diagnostic interface or a setup interface for the gaming machine. In the case of a diagnostic interface, color may be used to include the status of various components within the gaming machine.

In further embodiments of the invention, superimposed video image 18 may be used to provide a live broadcast stream to a player. For example, a player may wish to view a sporting event being broadcast over public airwaves or cable channels. The superimposed video image 18 may be used to display such broadcasts while the player is playing the wagering game.

Figure 10A:
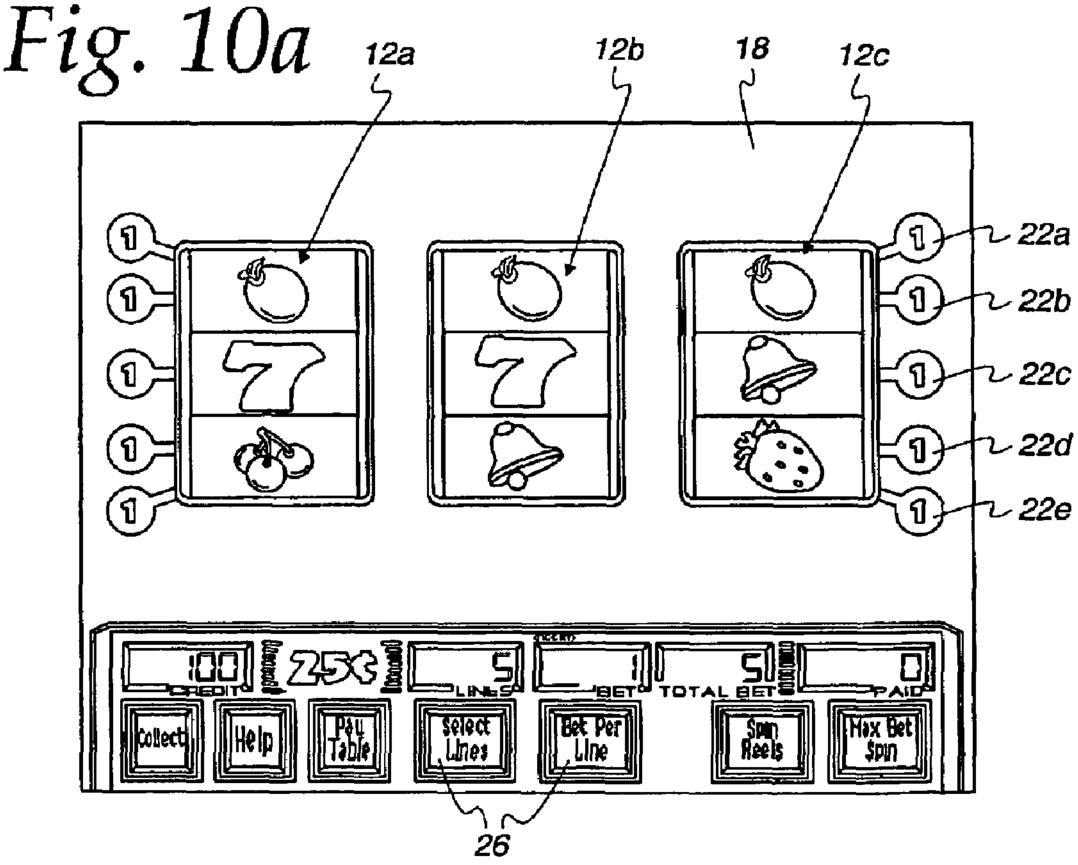
Figure 10B:
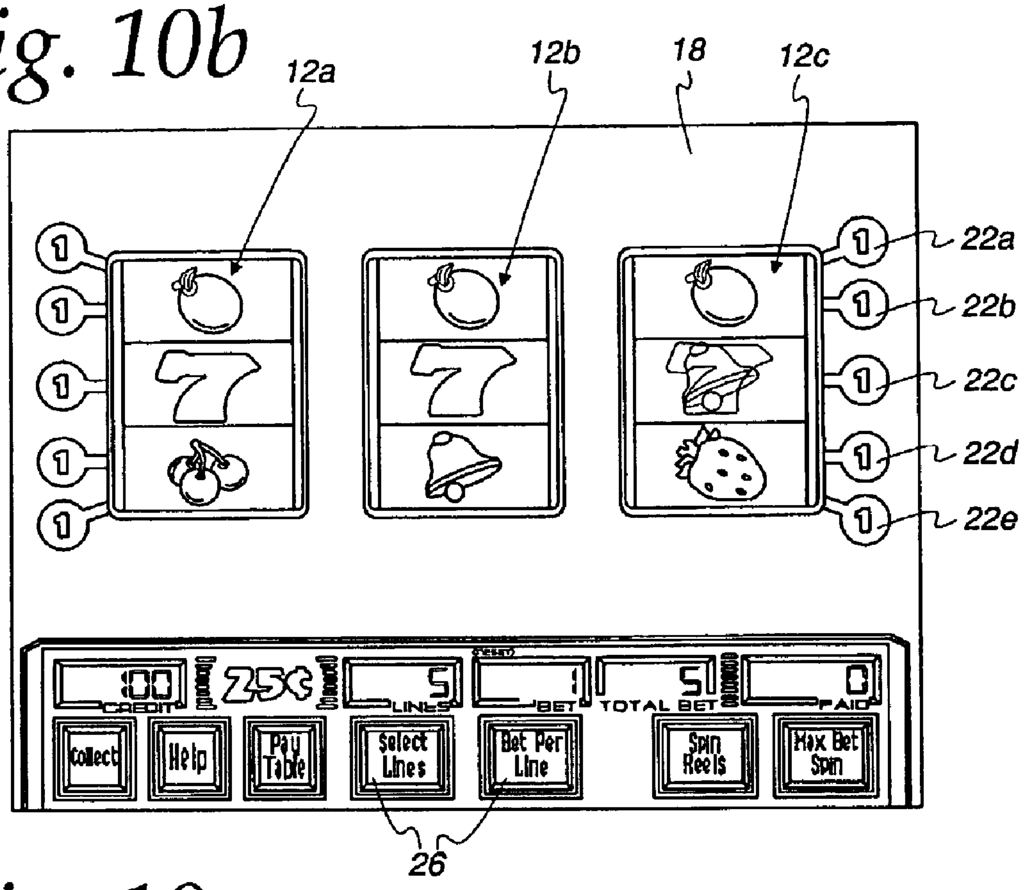
Figure 10C:
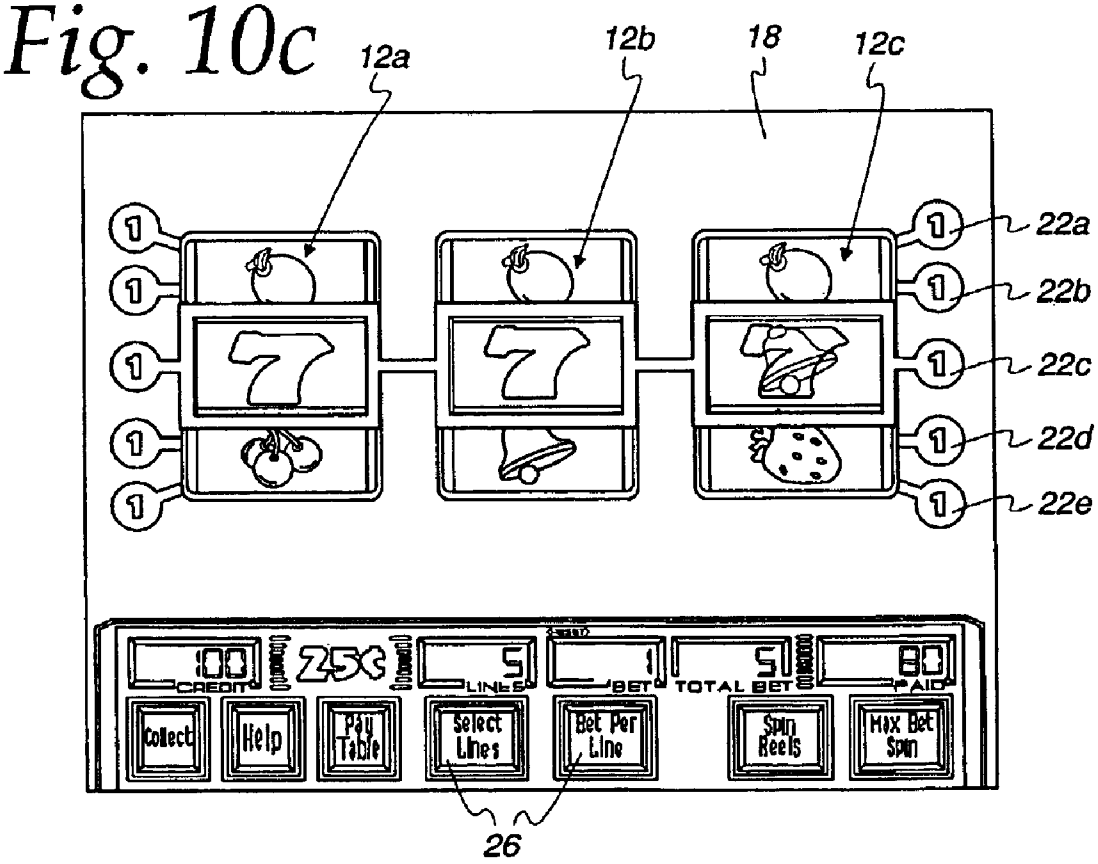
Figure 10D:
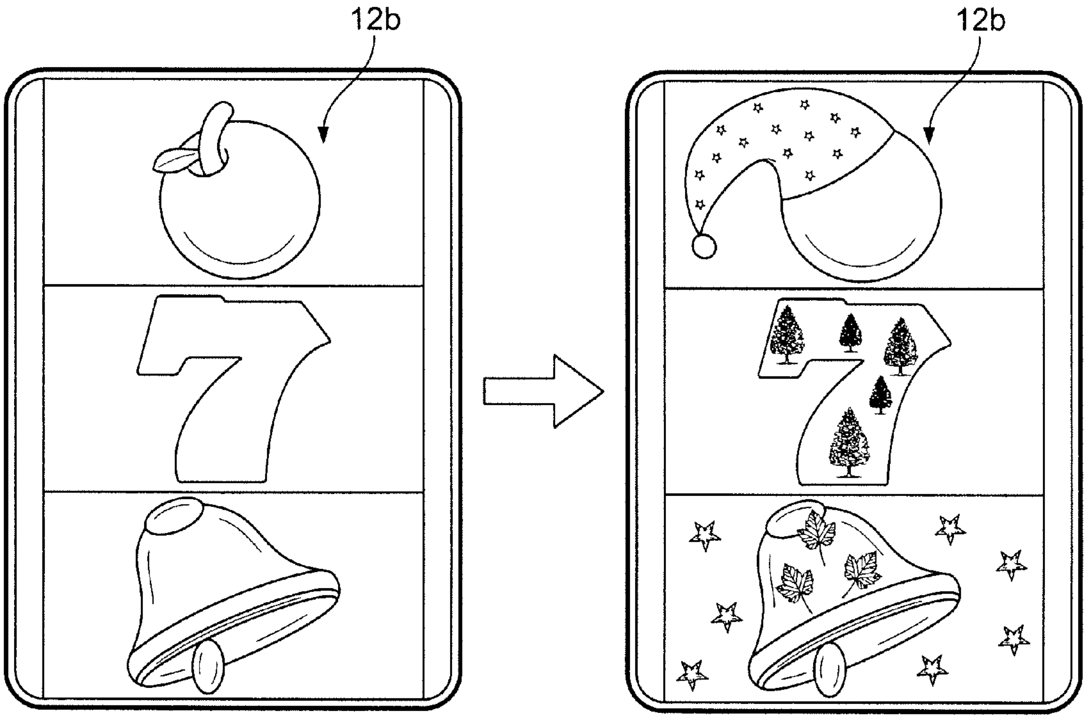

It should be noted that in nearly all cases, the images supplied by superimposed video image 18 may change over time. For example, the theme of symbols, reels or advertising may be changed based on the time of day, the day of the week, or in accordance with a holiday, such as the changing of the generic symbols to Christmas-themed symbols as shown in FIG. 10*d*. Further details concerning time-based changes are disclosed in United States Patent Application Publication 2002/0039919 entitled "Gaming Machine With Video and Audio Indicia Changed Over Time," which is hereby incorporated by referenced herein.

Figure 10E:
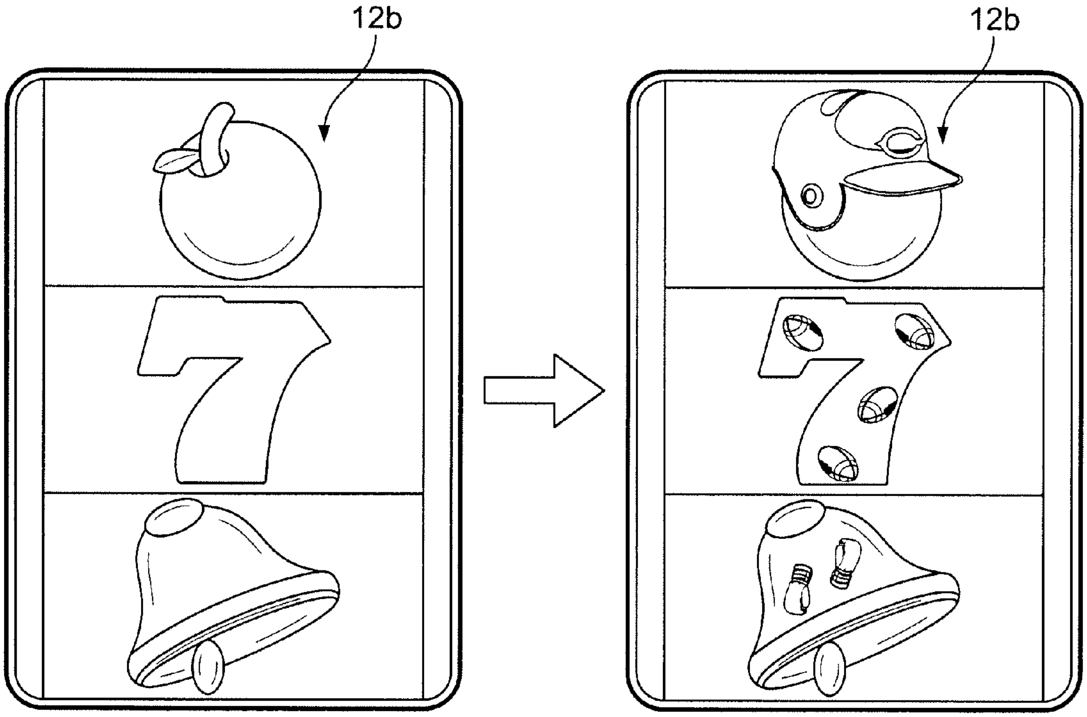
Figure 11:
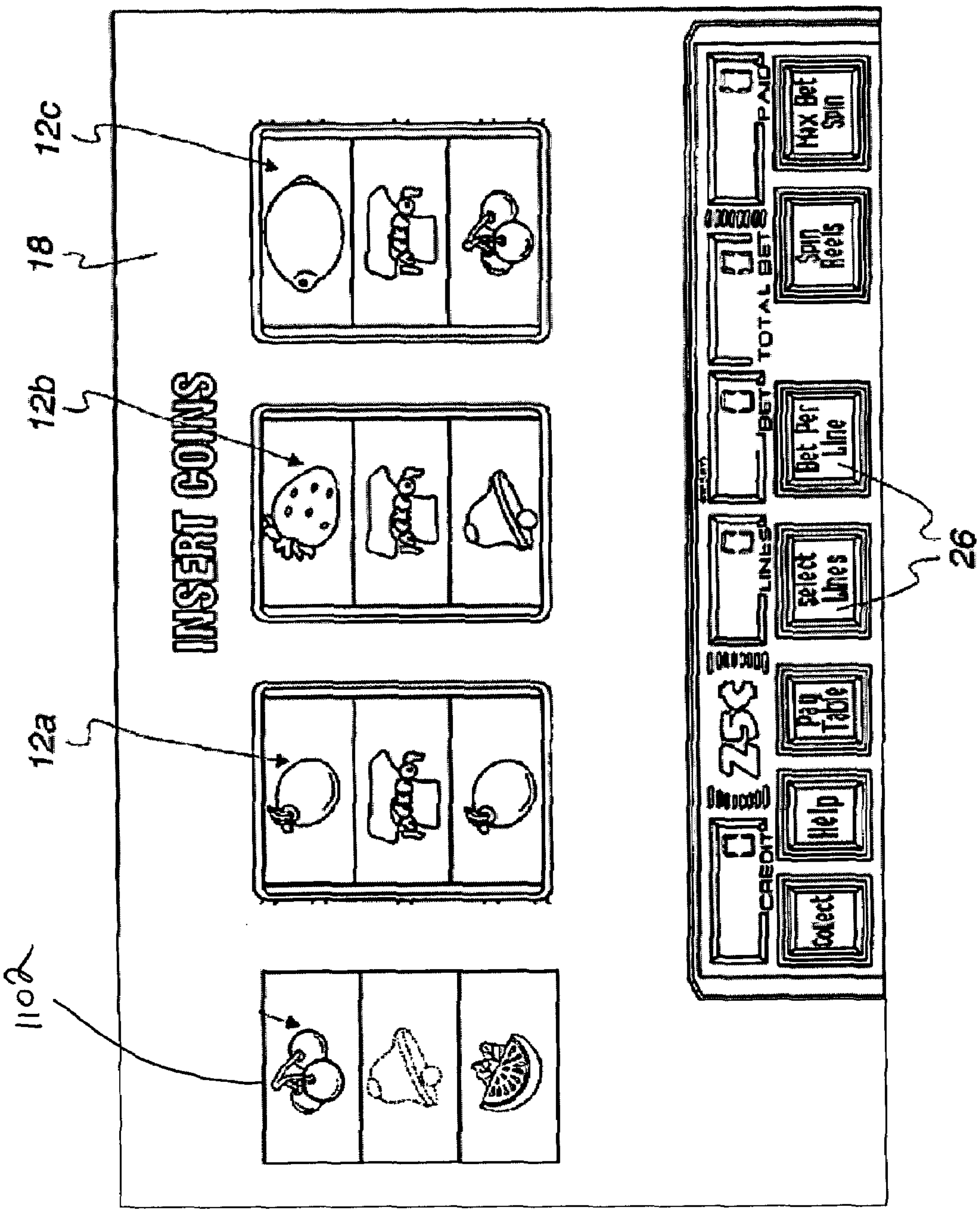

Further, the images supplied by superimposed video image 18 may be personalized if the the identity of a player is known. For example, if it is known that a player enjoys sports, the symbols, reels and other images supplied by video image 18 may be personalized with a sports theme, as shown in FIG. 10*e* in which the generic symbols change to sports-themed symbols.

FIG. 12 is a block diagram of a control system suitable for operating the gaming machine. The control system includes a central processing unit with a microcontroller 30 and system memory 32. The memory 32 preferably comprises a separate read-only memory (ROM) and battery-backed random-access memory (RAM). It will be appreciated, however, that the system memory 32 may be implemented on any of several alternative types of memory structures or may be implemented on a single memory structure. For example, the read-only memory may be replaced or supplemented with a mass storage unit such as a removable flash memory or a hard drive. The system memory may be used to store game-related data associated with the chance games played on the gaming machine. The game-related data may, for example, include game code, math tables, a random number generator, audio resources, and video resources. The player may select an amount to wager and other game play functions via the touch screen keys 26 (if provided) or button panel 24. The wager amount is signaled to the microcontroller 30 by a coin/credit detector 34. In response to the wager, the microcontroller 30 executes the game code which generates a randomly based outcome. In the case of slots, the microcontroller 30, based on the randomly generated outcome, rotates and stops the mechanical reels 12*a*, 12*b*, 12*c* at the selected outcome. Also, the microcontroller 30 selectively accesses the video resources to be included in the video image 18 provided by the video display 14*a* (FIG. 2*a*) or 14*b* (FIG. 2*b*) and the audio resources to be played through one or more audio speakers 36 mounted to a housing of the slot machine. If the outcome corresponds to a winning outcome identified on the pay table, the microcontroller 30 instructs a payoff mechanism 38 to award a payoff for that winning outcome to the player in the form of coins or credits.

While the present invention has been described with reference to one or more particular embodiments, those skilled in the art will recognize that many changes may be made thereto without departing from the spirit and scope of the present invention. For example, instead of the video image 18 depicting a bonus game triggered by a start-bonus outcome on the mechanical slot reels 12*a*, 12*b*, 12*c*, the roles of the video image 18 and the slot reels may be reversed. The video image 18 may depict a basic game including a start-bonus outcome for triggering a bonus game involving spins of the slot reels.

CONCLUSION

Various embodiments of a gaming machine with a superimposed video image have been disclosed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A gaming machine for playing one or more wagering games comprising:

a primary game display operable to display a plurality of symbols, the plurality of symbols including a generic symbol; and a secondary game display operable to display images spaced away from and overlaying the primary game display, the secondary game display (i) providing a first supplemental thematic indicia superimposed over the generic symbol of the plurality of symbols to create a first thematic symbol constituted from the first thematic indicia and the generic symbol, the first thematic symbol being used to indicate a first randomly selected outcome and (ii) providing a second supplemental thematic indicia superimposed over the generic symbol of the plurality of symbols to create a second thematic symbol constituted from the second thematic indicia and the generic symbol, said second thematic symbol being used to indicate a second randomly selected outcome, and wherein said first thematic symbol and said second thematic symbol are associated with themes in the one or more wagering games.

2. The gaming machine of claim 1, wherein the first supplemental thematic indicia indicates the value of the generic symbol.

3. The gaming machine of claim 1, wherein the gaming device comprises a slot machine having a plurality of reels on the primary game display and the generic symbol comprises a position on a reel of the slot machine.

4. The gaming machine of claim 1, wherein the primary game display includes a wheel having a plurality of positions and the generic symbol comprises a position on the wheel.

5. The gaming machine of claim 1, wherein the generic symbol comprises a symbol on a backlit game board.

6. The gaming machine of claim 1, wherein the secondary display is operable to move the first and second supplemental thematic indicia in synchronization with a movement of the generic symbol.

7. The gaming machine of claim 1, wherein the first supplemental thematic indicia comprises a live video stream superimposed onto the generic symbol.

8. The gaming machine of claim 1, wherein the primary game display comprises a video display.

9. A gaming machine comprising:

a primary game display for displaying a plurality of symbols for indicating randomly selected outcomes of a wagering game, the plurality of symbols including a blank symbol; and a secondary game display operable to (i) provide a first video symbol superimposed onto the blank symbol such that the first video symbol, in conjunction with other ones of the plurality of symbols, indicates a first randomly selected outcome of the wagering game and (ii) provide a second video symbol superimposed onto the blank symbol such that the second video symbol, in conjunction with other ones of the plurality of symbols, indicates a second randomly selected outcome of the wagering game.

10. The gaming machine of claim 9, wherein the plurality of symbols on the primary game display are located on a plurality of mechanical reels.

11. The gaming machine of claim 10, wherein the first video symbol moves in synchronized movement with one of the plurality of mechanical reels having the blank symbol.

12. The gaming machine of claim 9, wherein the first video symbol is animated to depict transformation of the blank symbol to the first video symbol.

13. The gaming machine of claim 9, wherein the first video symbol and the second video symbol are indicative of a theme of the wagering game.

14. The gaming machine of claim 9, wherein the first video symbol includes value-related indicia.

15. The gaming machine of claim 9, wherein the blank symbol is a solid white area.

16. The gaming machine of claim 9, wherein the secondary game display is a flat panel transmissive display overlaying the primary display.

17. A method of operating a gaming machine, comprising:

displaying, via a primary game display of the gaming machine, a plurality of symbols including a blank symbol;

displaying, via a secondary game display of the gaming machine, a first video symbol overlaying and spatially separated from the blank symbol, the first video symbol and other symbols from the plurality of symbols forming a symbol combination for indicating a randomly selected outcome of the wagering game; and awarding any payout associated with the symbol combination.

18. The method of claim 17, wherein the displaying the plurality of symbols on the primary game display includes moving a plurality of mechanical reels.

19. The method of claim 18, wherein the first video symbol moves with synchronized movement with respect to one of the plurality of mechanical reels having the blank symbol.

20. The gaming machine of claim 17, wherein the secondary game display is a flat panel transmissive display overlaying the primary display.

* * * * *